US011674635B1

(12) United States Patent
White

(10) Patent No.: US 11,674,635 B1
(45) Date of Patent: Jun. 13, 2023

(54) SUPPORT DEVICE

(71) Applicant: Adaptive Creations Group, Inc., Sarasota, FL (US)

(72) Inventor: Steven N. White, Sarasota, FL (US)

(73) Assignee: ADAPTIVE CREATIONS GROUP, INC., Sarasota, FL (US)

( * ) Notice: Subject to any disclaimer, the term of this patent is extended or adjusted under 35 U.S.C. 154(b) by 0 days.

(21) Appl. No.: 17/146,591

(22) Filed: Jan. 12, 2021

Related U.S. Application Data

(60) Provisional application No. 62/960,256, filed on Jan. 13, 2020.

(51) Int. Cl.
| | |
|---|---|
| *F16M 13/02* | (2006.01) |
| *A47G 23/02* | (2006.01) |
| *F16C 11/06* | (2006.01) |
| *A61G 5/10* | (2006.01) |
| *F16B 2/06* | (2006.01) |

(52) U.S. Cl.
CPC ....... *F16M 13/022* (2013.01); *A47G 23/0225* (2013.01); *A61G 5/10* (2013.01); *F16C 11/06* (2013.01); *F16B 2/065* (2013.01)

(58) Field of Classification Search
CPC ... F16M 13/022; A47G 23/0225; F16B 2/065; F16C 11/06
USPC .... 248/231.71, 226.11, 288.31, 181.1, 181.2
See application file for complete search history.

(56) References Cited

U.S. PATENT DOCUMENTS

| | | | | |
|---|---|---|---|---|
| 6,220,556 | B1 * | 4/2001 | Sohrt ................... | F16C 11/106 403/56 |
| 6,802,265 | B1 * | 10/2004 | Dodson .................... | A47B 9/08 108/1 |
| D502,956 | S * | 3/2005 | Holmes ......................... | 396/428 |
| 6,896,231 | B1 | 5/2005 | Sullivan, Sr. | |
| 7,546,993 | B1 | 6/2009 | Walker | |
| 9,121,423 | B2 | 9/2015 | Sharpe et al. | |
| 2004/0211868 | A1 * | 10/2004 | Holmes ................ | F16M 13/022 248/231.71 |
| 2005/0006542 | A1 * | 1/2005 | Henning ............ | F16M 11/2064 248/274.1 |

(Continued)

FOREIGN PATENT DOCUMENTS

| | | |
|---|---|---|
| DE | 20 2018 001 412 U1 | 4/2018 |
| IN | 1268/DEL/2015 | 6/2015 |

OTHER PUBLICATIONS https://www.mealtimepartners.com/drinking/drinking.htm.
https://livingaidsstore.com/third-arm-hands-free-cup-holder/.

*Primary Examiner* — Muhammad Ijaz
(74) *Attorney, Agent, or Firm* — Frijouf, Rust & Pyle, PA.

(57) ABSTRACT

A support device is disclosed for supporting an object. The support device comprises a clamping member applying a compressive force against a base. A lower ball joint member is coupled to the clamping member. A sleeve remember is coupled to the lower ball joint member. An arm member slidably engages relative to the sleeve member. An upper ball joint member is coupled to the arm member. A platform is coupled to the upper ball joint member for supporting the object. The lower ball joint member defines a first pivoting non-planar adjustment. The pivot joint member defines a pivoting planar adjustment. The extension member defines an elevational adjustment. The upper ball joint member defines a second pivoting non-planar adjustment.

30 Claims, 19 Drawing Sheets

(56) References Cited

U.S. PATENT DOCUMENTS

| | | | |
|---|---|---|---|
| 2013/0112827 A1* | 5/2013 | Holstad | A61G 5/12 248/229.2 |
| 2015/0090849 A1 | 4/2015 | Breitweiser et al. | |
| 2018/0049951 A1 | 2/2018 | Hunter | |

* cited by examiner

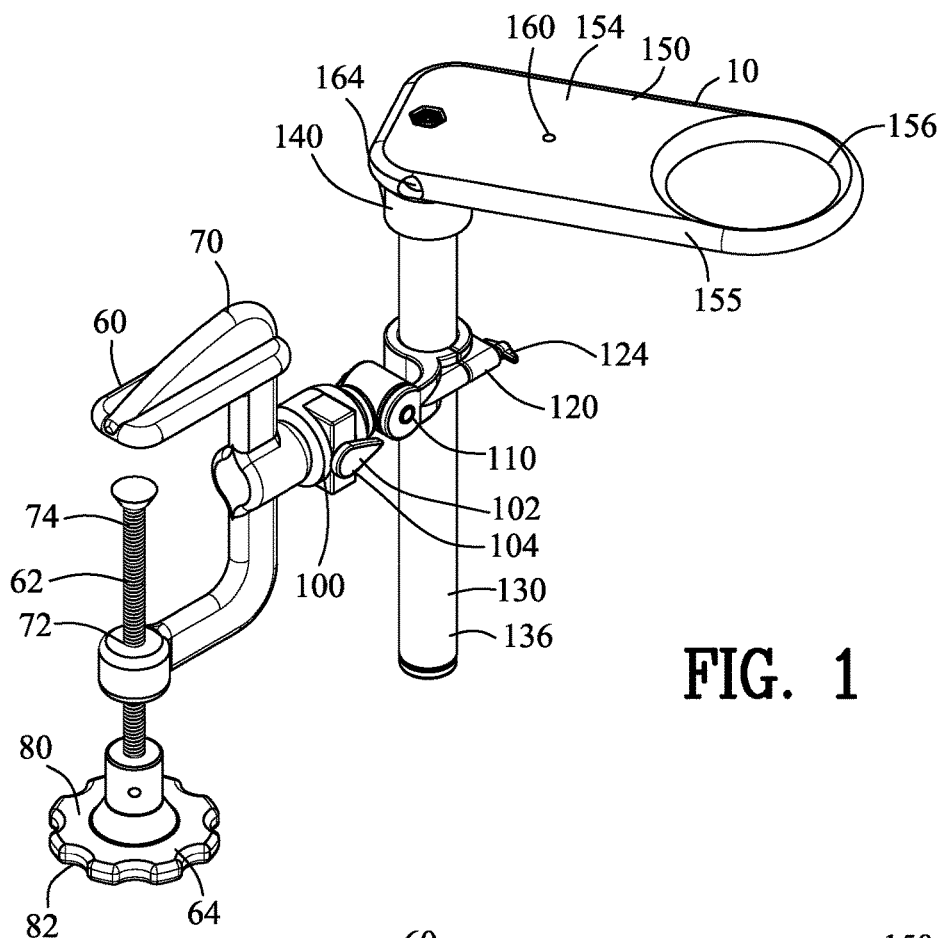
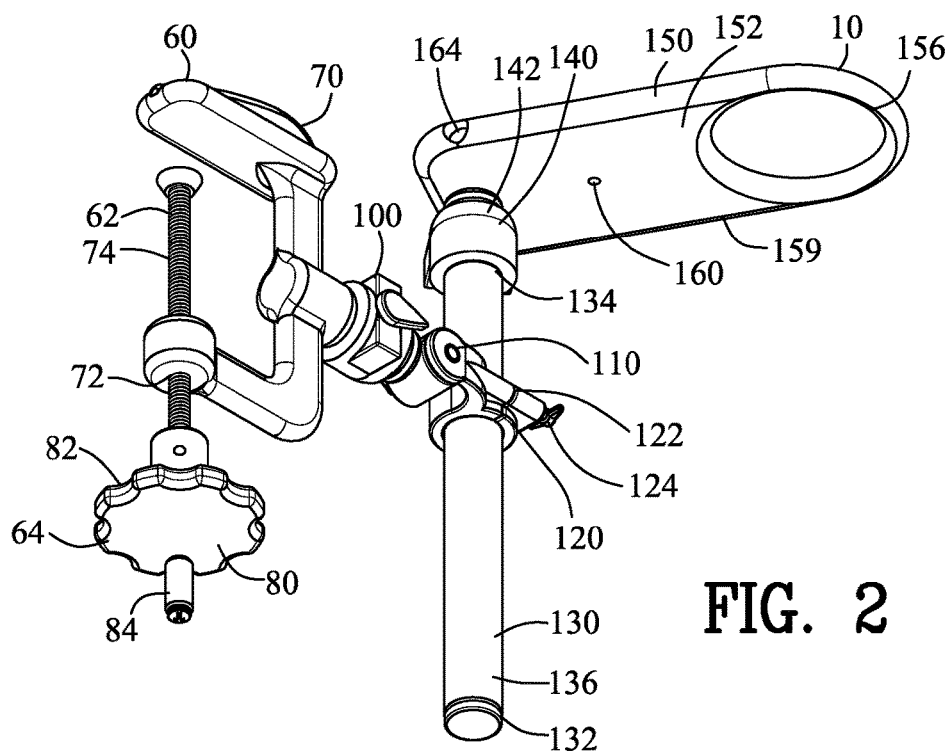

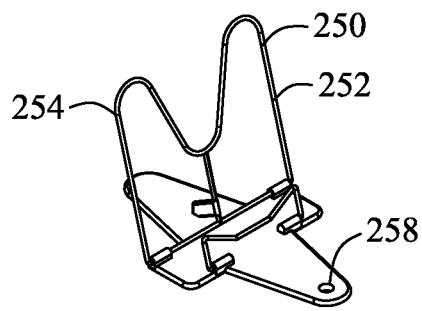
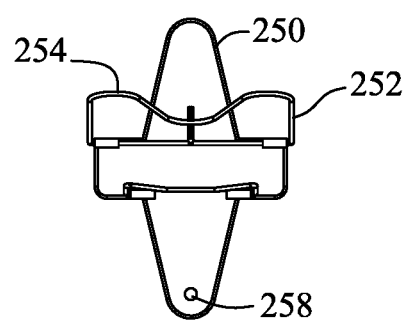
FIG. 7        FIG. 8
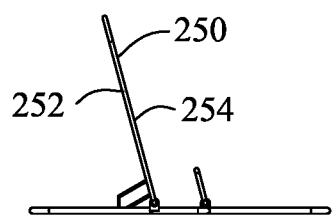
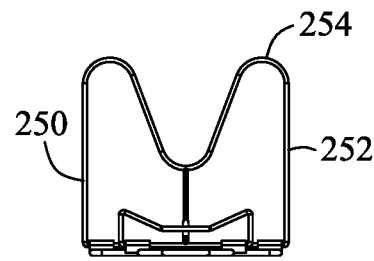
FIG. 9        FIG. 10
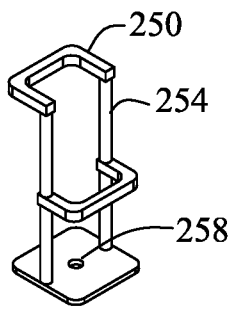
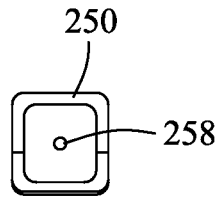
FIG. 11        FIG. 12
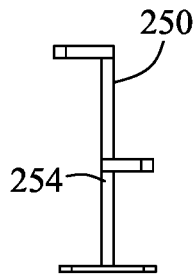
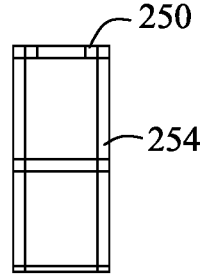
FIG. 13        FIG. 14

SUPPORT DEVICE

CROSS-REFERENCE TO RELATED APPLICATIONS

This application claims benefit of U.S. Patent Provisional application Ser. No. 62/960,256 filed Jan. 13, 2020. All subject matter set forth in provisional application ser. no. 62/960256 is hereby incorporated by reference into the present application as if fully set forth herein.

BACKGROUND OF THE INVENTION

Field of the Invention

This invention relates to supports and more particularly to an improved support device.

Background of the Invention

Persons suffering from a wide range of neuromuscular diseases (e.g., Parkinson's, Muscular Dystrophy Multiple Sclerosis, Cerebral Palsy, ALS, etc.), stroke, dementia, birth defects, visual impairments, burns, traumatic brain injuries, spinal cord injuries, and those with upper extremity injuries or amputations experience great difficulty in drinking from glasses and cups. This results in frequent tipping or dropping of the container with associated spillage, burns, breakage, and soiling of body, clothing, furniture and floors.

Patients in hospitals and therapeutic facilities, as well as family members at home, are frequently positioned in beds or recliner chairs to eat or drink with their upper body at significantly less than a 90°) angle or otherwise close enough to be positioned normally over a tray or dining table. In such situations the individual must lift their drink across their lap and chest increasing the risk of harm from spillage due to tremors or weakness.

To avoid dangerous spills healthcare professionals and home caregivers must frequently hold the beverage container for the patient or family member thereby taking time away from other responsibilities. In addition, having to repeatedly change clothing and bedding, and clean beds, chairs and floors, diverts staff and family time and adds operational expenses for healthcare facilities.

Other users of the invention will include those that must use both hands for tasks, or prefer not holding a drinking container, cellphone, tablet, book or computer notebook, etc. to avoid contamination. These would include surgeons, gamers, cooks, artists, musicians, 911 dispatchers, call center representatives, court stenographers, industrial workers, students, computer users, etc.

There have been many in the prior art who have attempted to solve these problems with varying degrees of success. None, however completely satisfies the requirements for a complete solution to the aforestated problem The following U.S. Patents are attempts of the prior art to solve this problem.

U.S. Pat. No. 6,896,231 to Sullivan, Sr. discloses a drink holder for disabled persons with the holder being adapted to be secured to a chair, wheelchair, bed, wall, etc. A cup holder is mounted to the outer end of an articulated arm assembly with the assembly being adjustable to properly position the cup holder. When a cup or glass is placed in the cup holder, a disabled person may move his or her head to gain access to the straw extending from the cup or glass in the cup holder.

U.S. Pat. No. 7,546,993 to Walker discloses a clamping apparatus of the present invention is used in a medical environment to rotationally and releasably secure a device to a support member. The clamping apparatus includes a device clamp having first and second clamp elements and a connector interconnecting the clamp elements. The clamp elements define a first receptacle for receiving a support and a second receptacle for receiving a mounting structure. At least one clamping element defines a device catch in the second receptacle. The connector is selectively moveable between a first position in which relative rotation between the flexible shaft, device clamp and device is resisted, and a second position in which the device is permitted to rotate without releasing connection to the support. A method of supporting a medical device on a support to permit selective rotation of the medical device relative to a flexible shaft without loss of interconnection is also disclosed.

U.S. Pat. No. 9,121,423 to Sharpe, et al. discloses a multi-directional clamping device having a clamp body, a mounting block and a mounting slide is described herein. The clamp body has a first and second arm forming the C-shaped clamp body. The mounting block having a conical receptacle therein is attached to the clamp body such that the base of conical shape faces upward. The mounting slide has a conical slide for complementary engagement with the mounting block.

U.S. Patent Application 2005/0006542 to Henning, et al. discloses a support arm for components such as flat screen monitors. In one embodiment, the support arm includes rigid arm segment and a flexible arm segment. The flexible area segment may be mounted adjacent to the supported component. The flexible arm segment includes a plurality of flexible tubes, each having a core surrounding by a material and a flexible coiled tube. Preferably, at least one of the flexible tubes is fixed at both ends while at least one of the flexible tubes includes a free floating end that is permitted to move longitudinally with respect to the fixed tube as the flexible arm is moved.

U.S Patent Application 2015/0090849 to Breitweiser, et al. discloses a medical device support apparatus for use in a medical environment to releasably secure a medical device to a support structure, the medical device support apparatus having a base member configured to releasably mount the medical device support apparatus on the support structure; and a medical device mounting assembly including a base attachment portion and a device attachment portion connected to the base attachment portion, and further including a connection mechanism mounting the base attachment portion on the base member for rotation about a roll axis relative to the base member whereby the medical device mounting assembly can hold the medical device at different selected angles about the roil axis with respect to the base member, the device attachment portion being constructed for translational, sliding reception of the medical device into mounting engagement with the device attachment portion.

U.S. Patent Application 2018/0049951 to Hunter discloses a vomit emission containment device is a device having an adjustable position container stand and container designed for placement of the container in close proximity to a nauseous person. The device has a stand with a vomit container holder having an accessory holder on the back side. The vomit container holder attaches to a stand that has a base, a vertical portion, and an arm that holds the container. Each section is joined by an adjustable angle elbow that together allows the container to be positioned horizontally and vertically.

Although the aforementioned prior art have contributed to die development of the art of support devices none of these prior art patens have solved the needs of the art.

Therefore, it is an object of the present invention to provide an improved support device.

Another object of this invention is to provide an improved support device that may be attached to multiple bases.

Another object of this invention is to provide an improved support device that may support multiple objects.

Another object of this invention is to provide an improved support device that is easily stored.

Another object of this invention is to provide an improved support device that is easily cleaned.

Another object of this invention is to provide an improved support device that is easy for an operator to use.

Another object of this invention is to provide an improved support device that is cost effective to produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved support device for supporting an object. The support device engages with a base. The support device comprises a clamping member applying a compressive force against the base. A lower ball joint member is coupled to the clamping member. A pivot joint member is coupled to the lower bail joint member. A sleeve member is coupled to the pivot joint member. An arm member slidably engages relative to the sleeve member for defining an extension member. An upper ball joint member is coupled to the arm nmember. A platform is coupled to the upper ball joint member for supporting the object. The lower ball joint member defines a first pivoting non-planar adjustment of the platform relative to the clamping member. The pivot joint member defines a pivoting planar adjustment of the platform relative to the clamping member. The extension member defines an elevational adjustment of the platform relative to the clamping member. The upper ball joint member defines a second pivoting non-planar adjustment of the platform relative to the clamping member. The clamping member, the lower ball joint member, the pivot joint member, the sleeve member, the arm member and the upper ball joint member define a three dimensional adjustable support for the platform.

In another embodiment of the invention, a tray defines a lower surface and an upper surface. A tray channel is coupled to the lower surface of the tray. The platform slidably engages with the tray channel and coupling the tray with the platform. The clamping member, the lower ball joint member, the pivot joint member, the sleeve member, the arm member and the upper ball joint member define a primary three dimensional adjustable support for the tray.

In another embodiment of the invention, a second clamping member applies a compressive force against the base. A telescoping member extends between a proximal end and a distal end. The proximal end of the telescoping member is coupled to the second clamping member. A ball joint member couples the distal end of the telescoping member to the lower surface of the tray. The second clamping member, telescoping member and the ball joint member define a secondary three dimensional adjustable support for the tray.

In another embodiment of the invention, an object holding device engages with the object. A linkage couples the object holding device with the platform.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an upper isometric view of a first embodiment of a support device incorporating the present invention;

FIG. 2 is a lower isometric view of FIG 1;

FIG. 7 is an upper isometric view of a book bolder utilized with the support device in FIG. 1;

FIG. 8 is a top view of FIG. 7;

FIG. 9 is a left side view of FIG. 7;

FIG. 10 is a front view of FIG. 7;

FIG. 11 is an upper: isometric view of a electronic device holder utilized with the support device in FIG. 1;

FIG. 12 is a top view of FIG. 11;

FIG. 13 is a left side view of FIG. 11;

FIG. 14 is a front view of FIG. 11;

Similar reference characters refer to similar parts throughout the several Figures of the drawings.

DETAILED DISCUSSION

Figure 3:
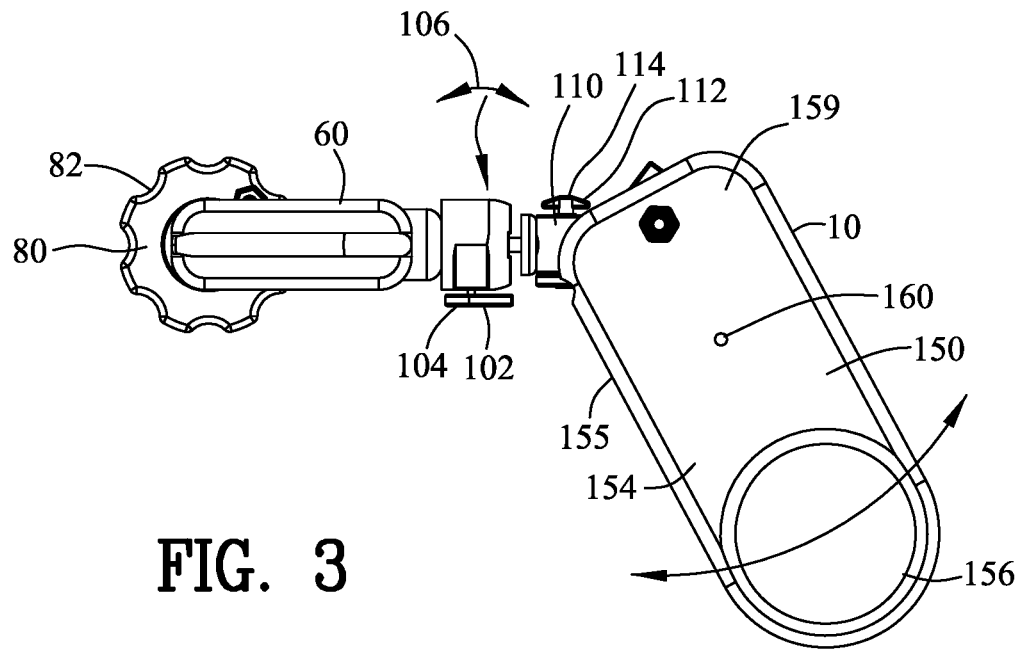
FIG. 3 is a top view of FIG. 1.
Figure 4:
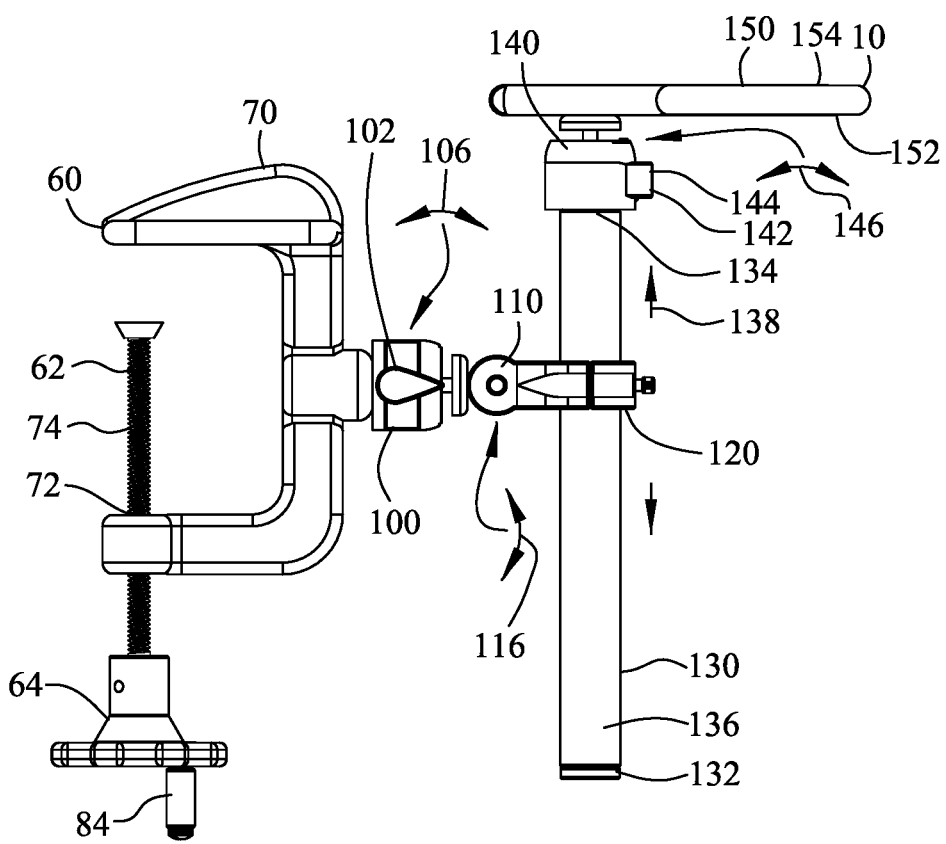
FIG. 4 is a front view of FIG. 1.
Figure 5:
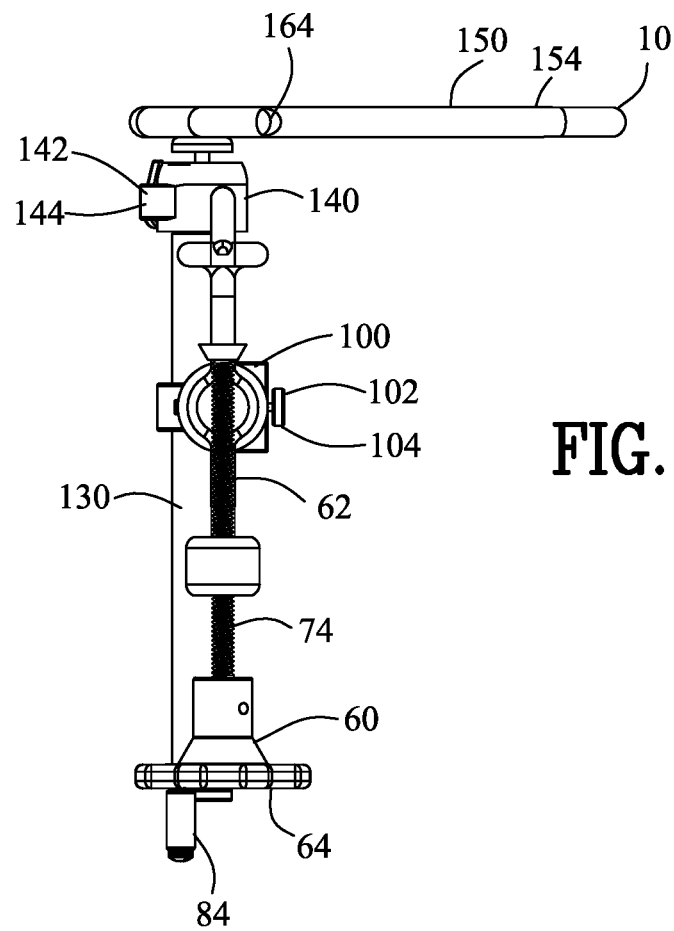
FIG. 5 is a left side view of FIG. 1.
Figure 6:
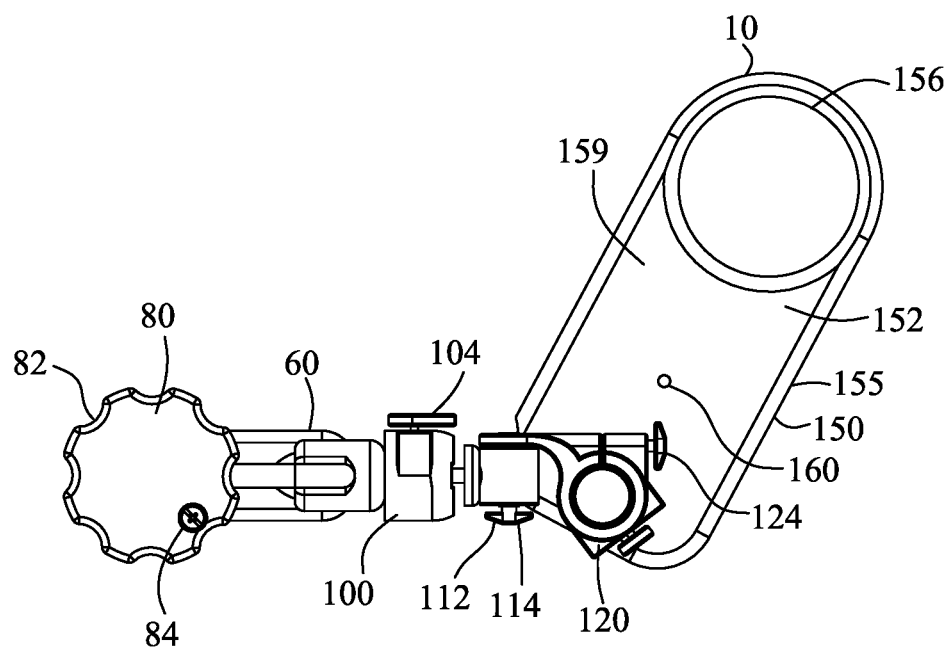
FIG. 6 is a bottom view of FIG. 1.
Figure 15:
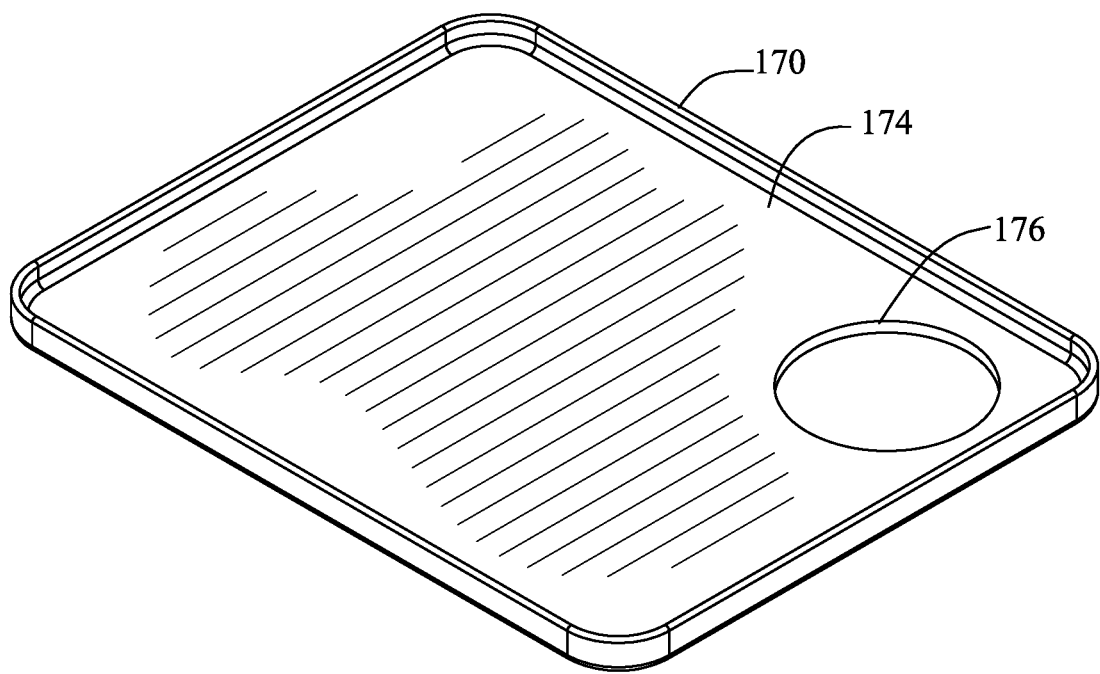
FIG. 15 is an upper isometric view of a first tray utilized with the support device in FIG. 1.
Figure 16:
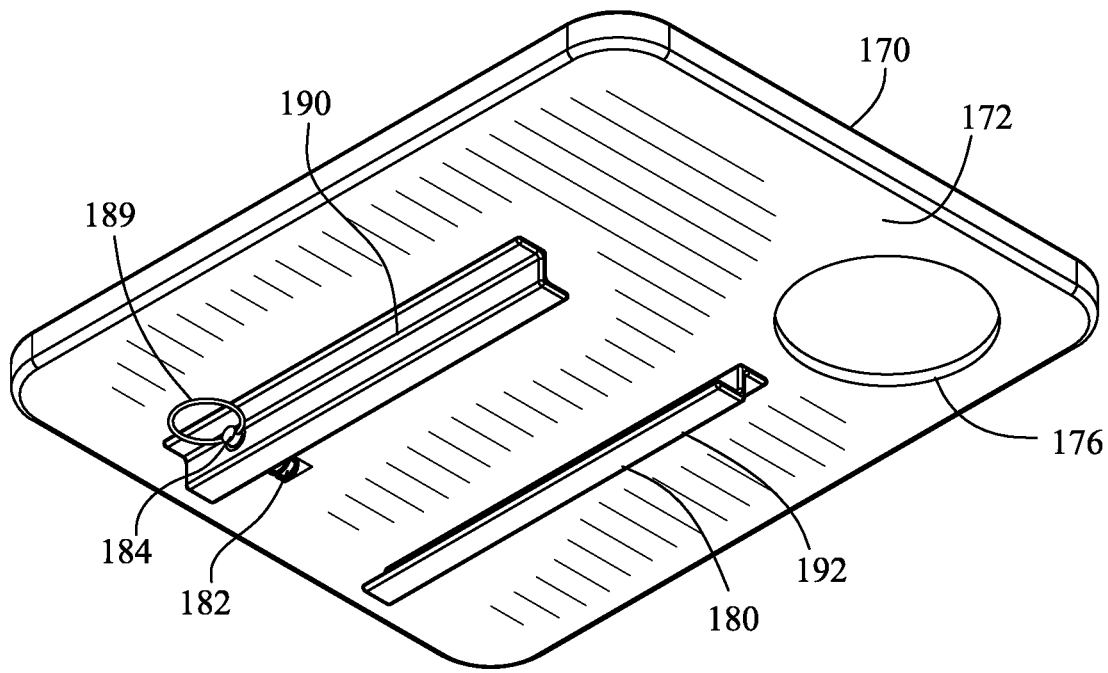
FIG. 16 is a lower isometric view of FIG. 15.
Figure 17:
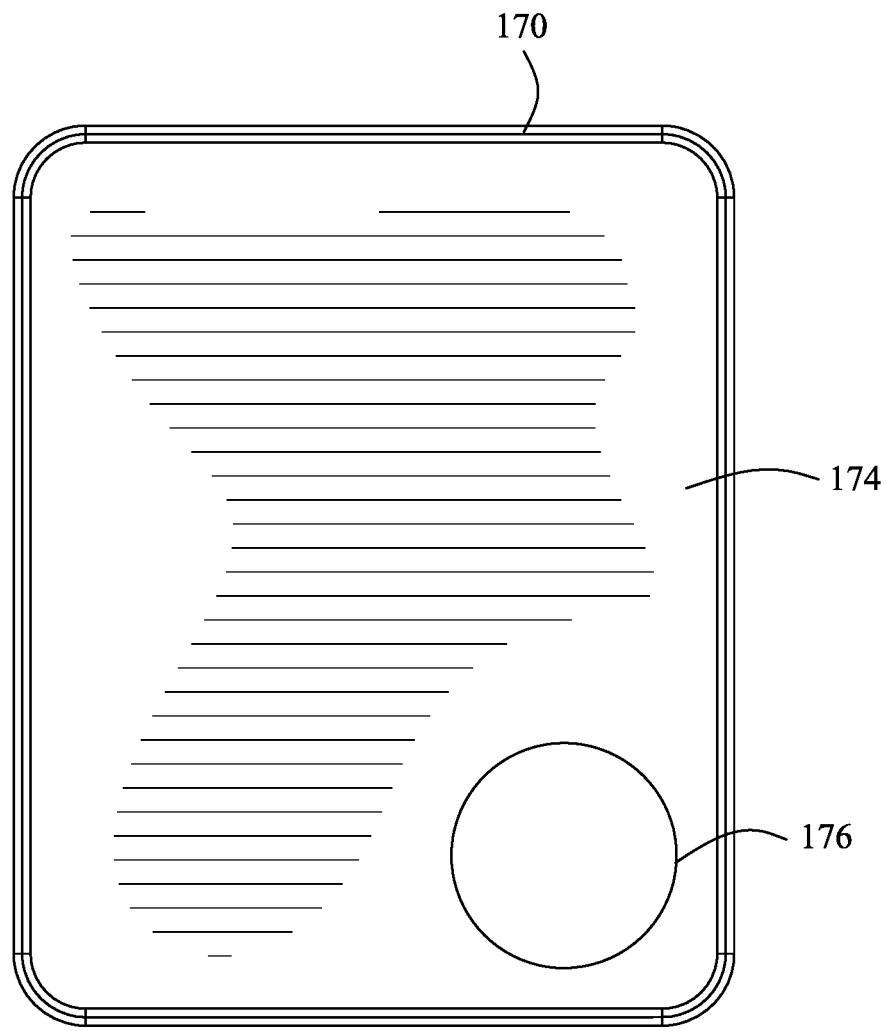
FIG. 17 is a top view of FIG. 15.
Figure 18:
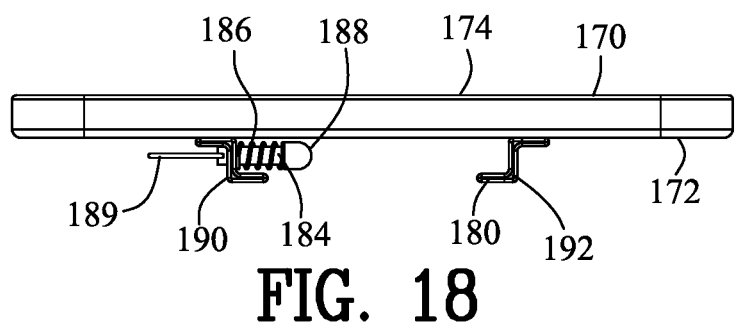
FIG. 18 is a front view of FIG. 15.
Figure 19:
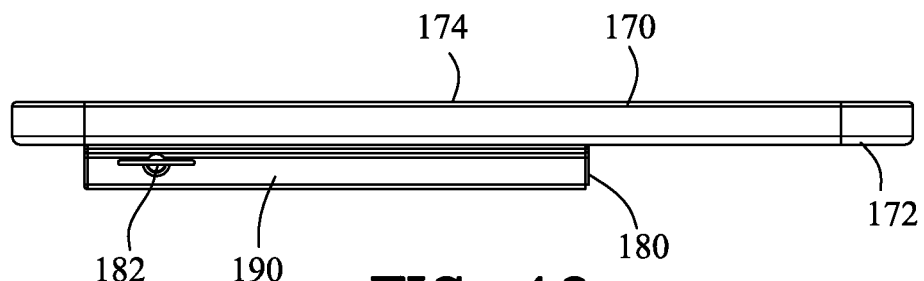
FIG. 19 is a left side view of FIG. 15.
Figure 20:
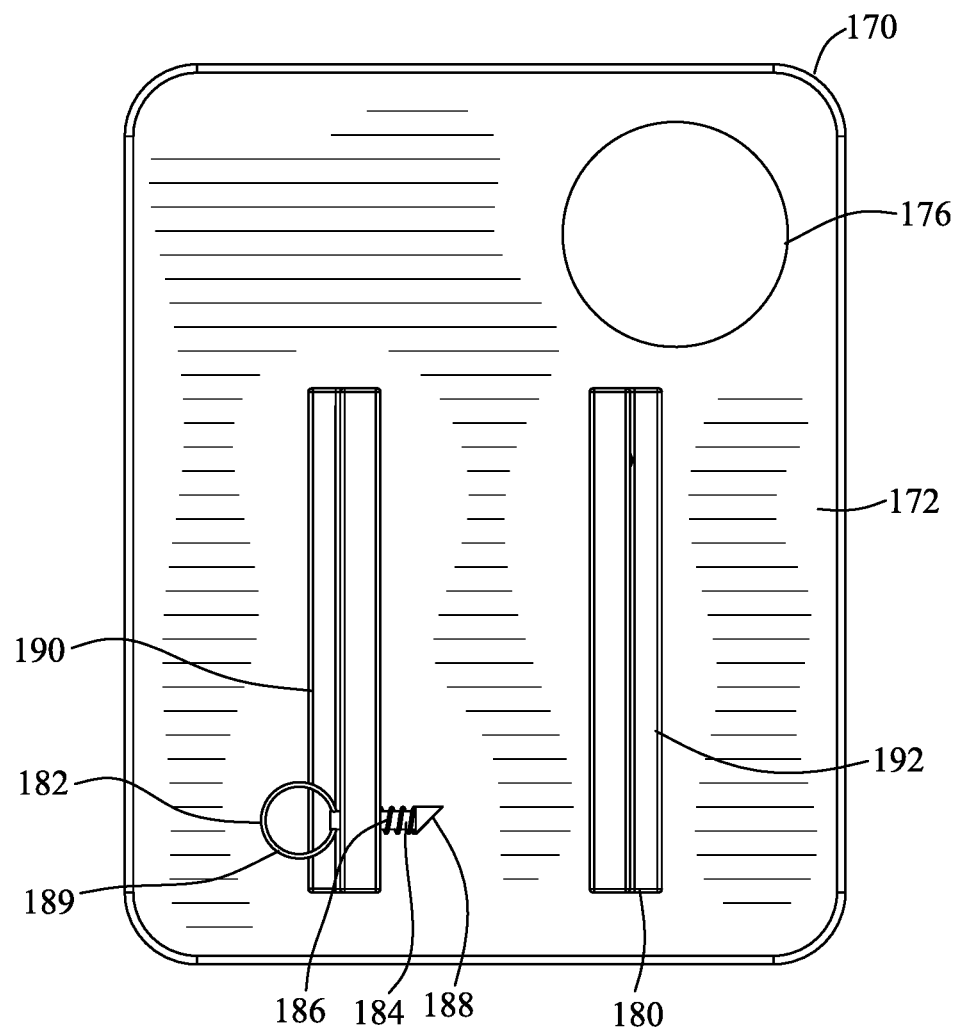
FIG. 20 is a bottom view of FIG. 15.
Figure 21:
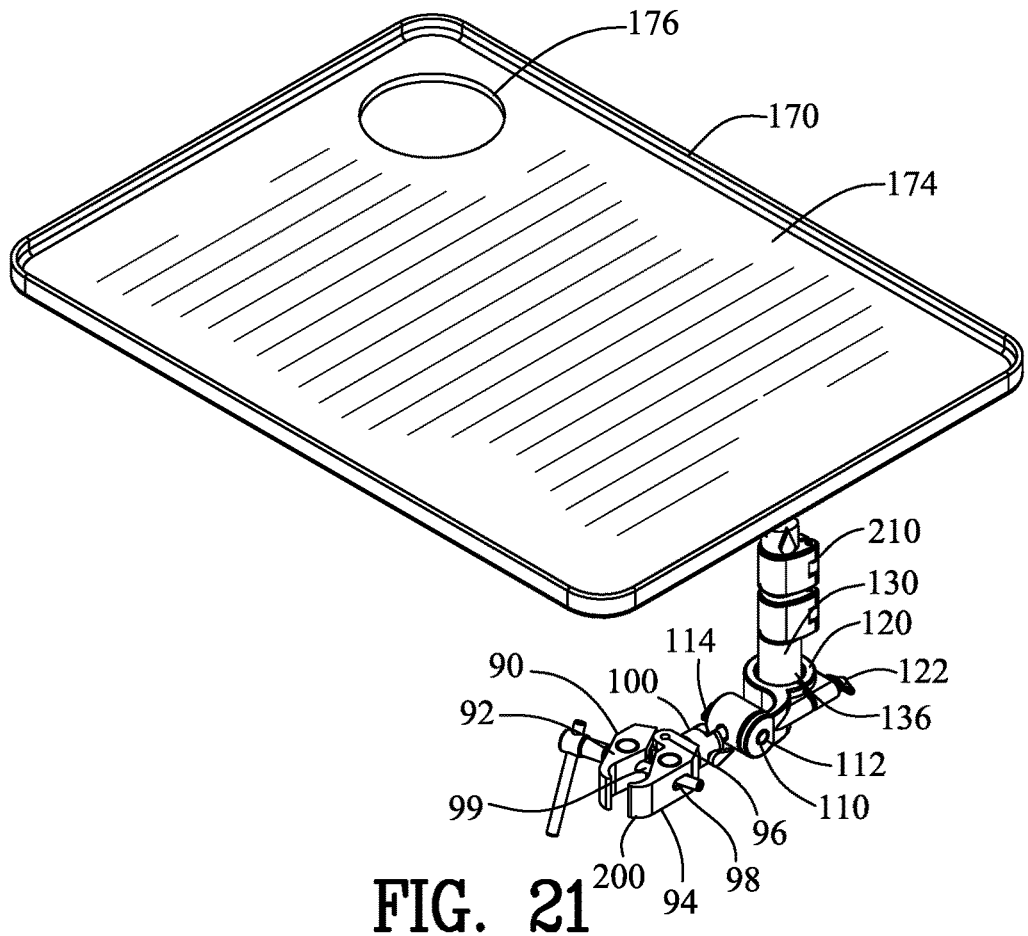
FIG. 21 is an upper isometric view of a second tray utilized with the support device in FIG. 1.
Figure 22:
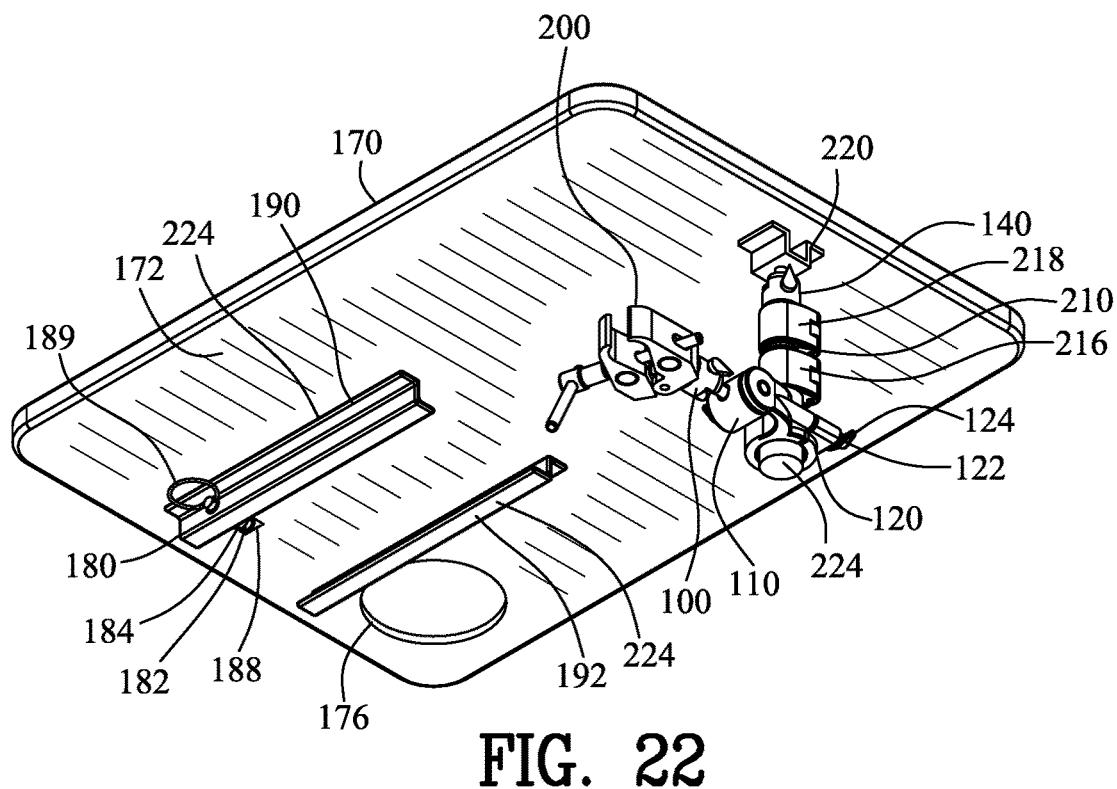
FIG. 22 is a lower isometric view of 21.
Figure 23:
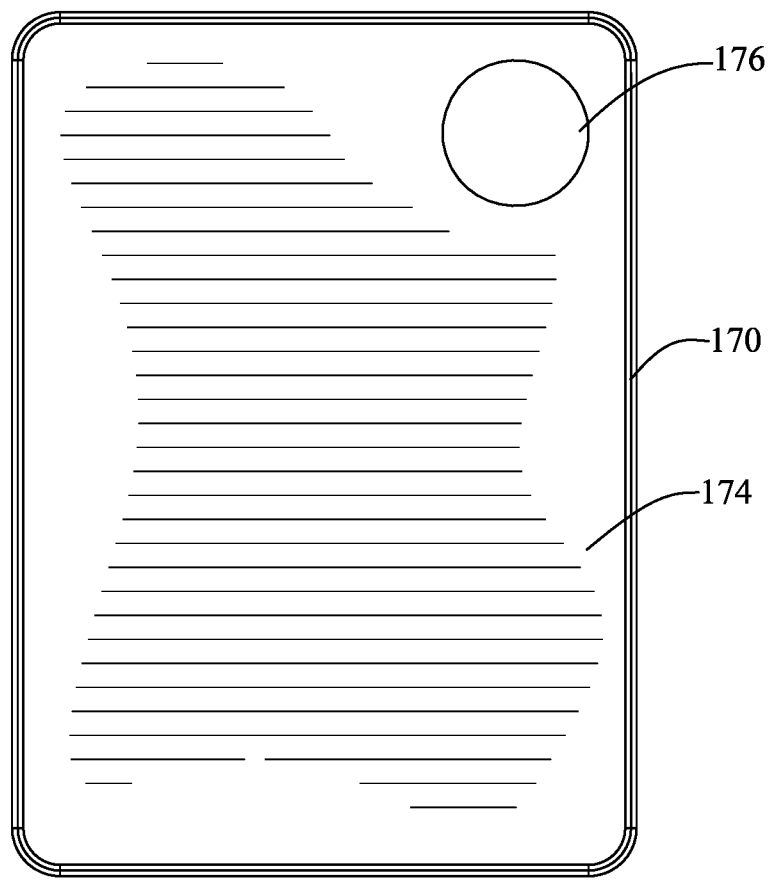
FIG. 23 is a top view of FIG. 21.
Figure 24:
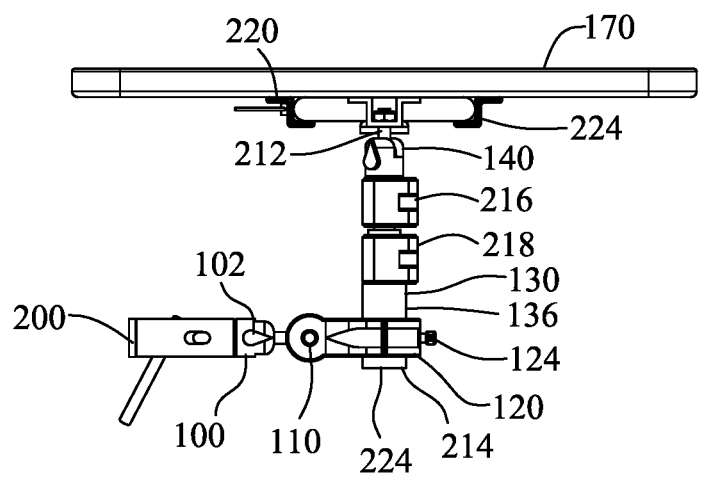
FIG. 24 is a front view of FIG. 21.
Figure 25:
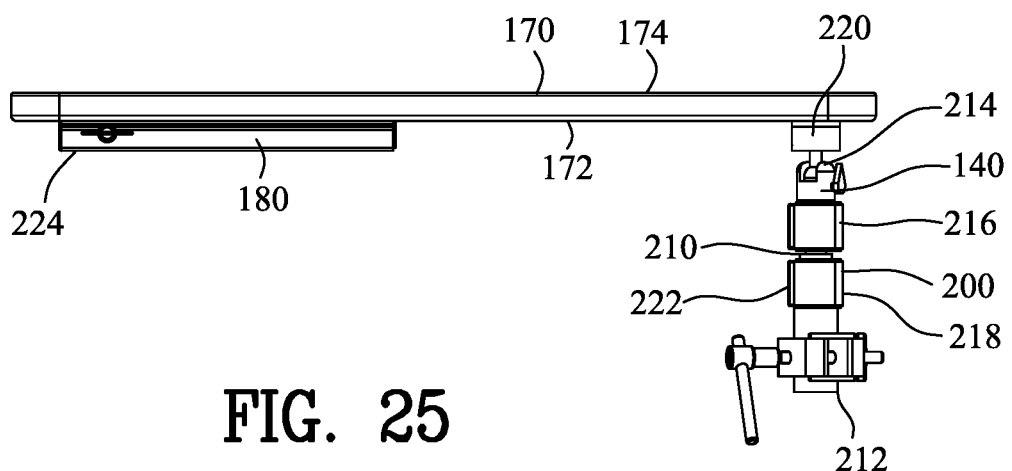
FIG. 25 is a left side view of FIG. 21.
Figure 26:
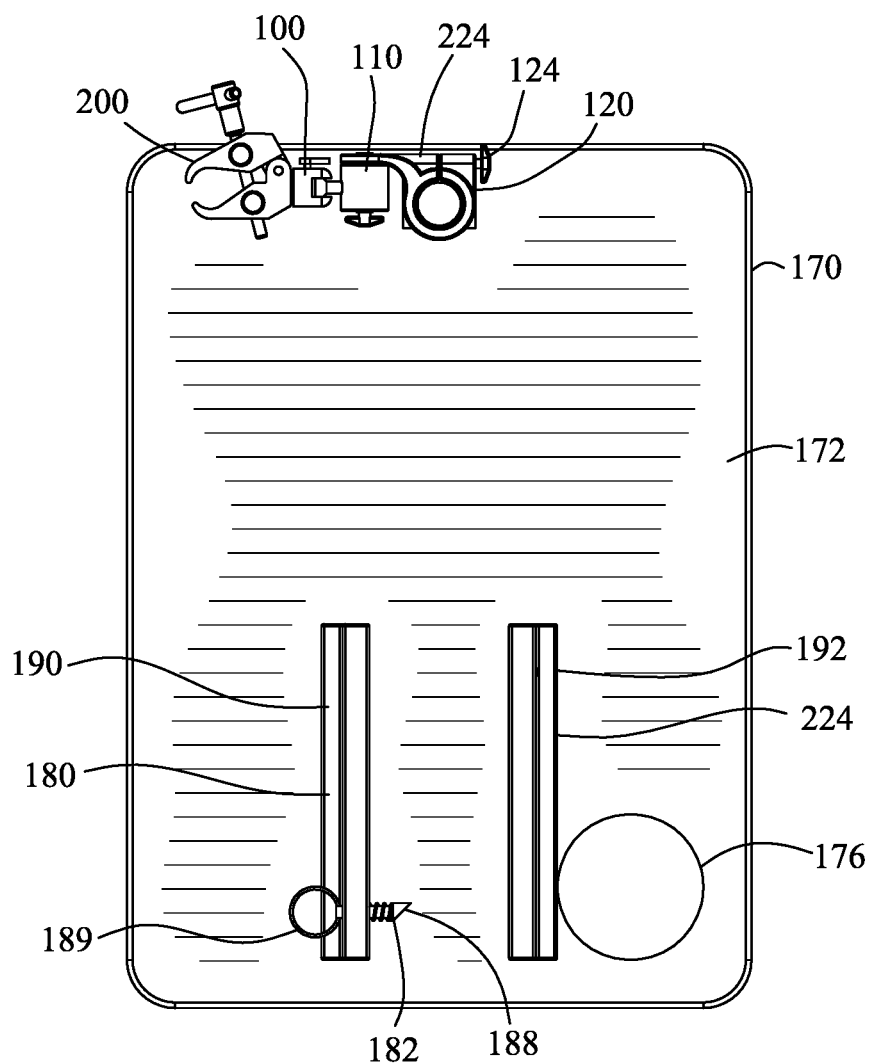
FIG. 26 is a bottom view of FIG. 21.
Figure 27:
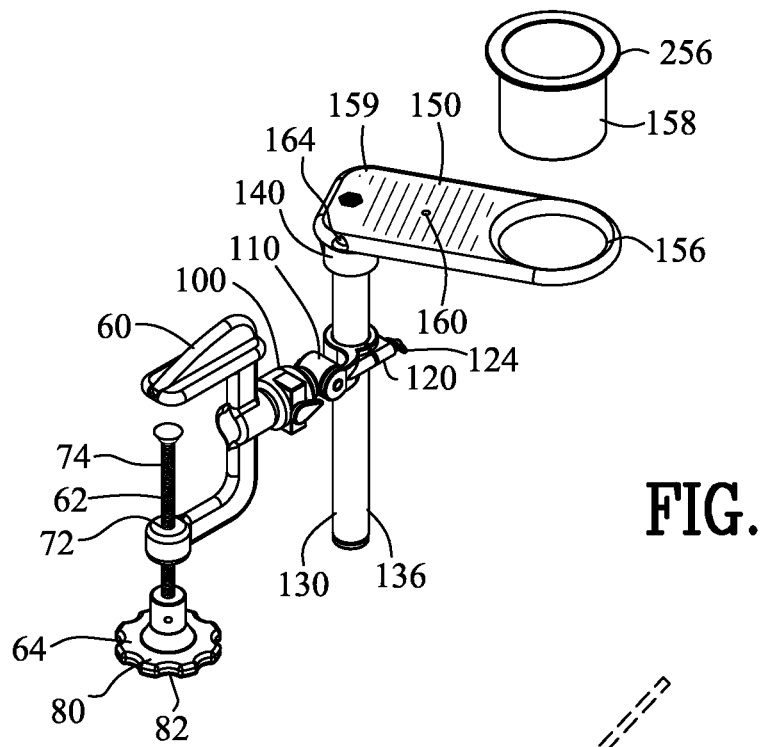
FIG. 27 is a view similar to FIG. 1 illustrating a cup holder in position to engage with a platform.
Figure 28:
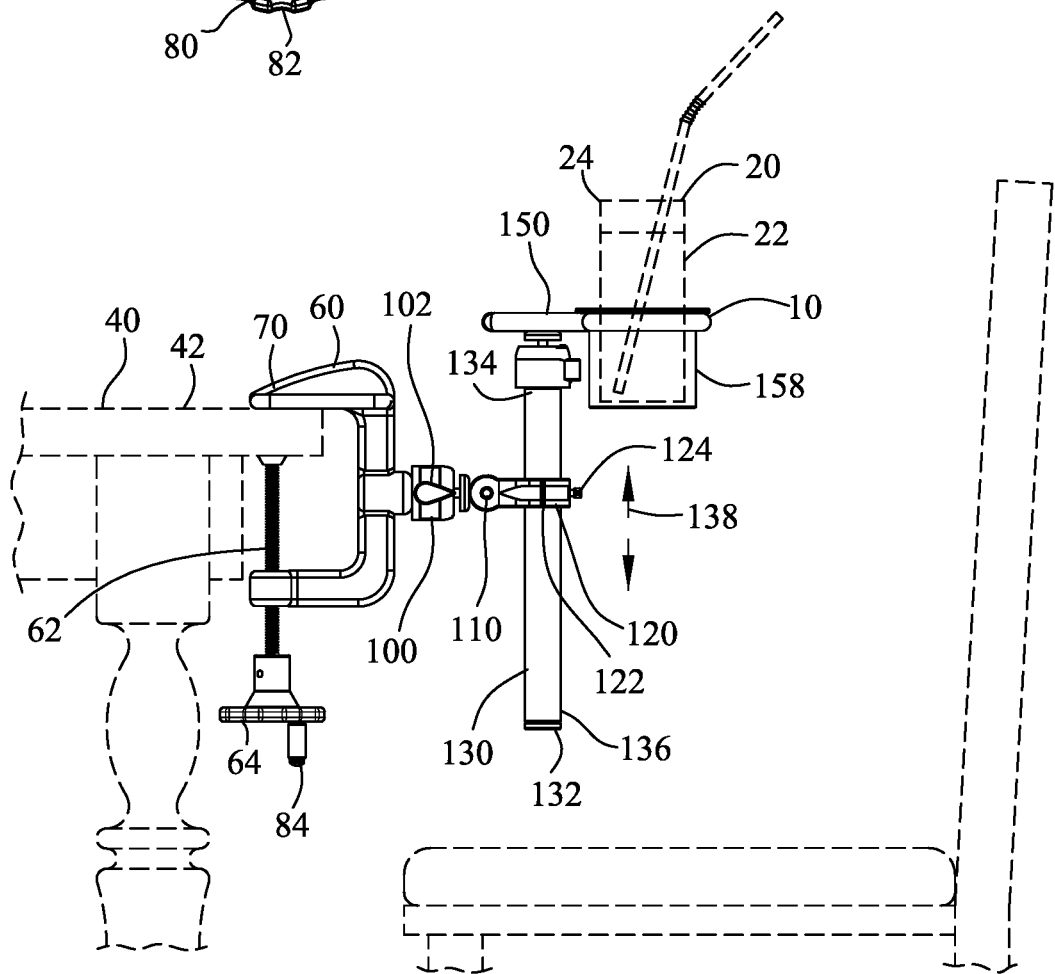
FIG. 28 is a view similar to FIG. 4 illustrating the support device engaging with a table and a cup engaging with the cup holder.
Figure 29:
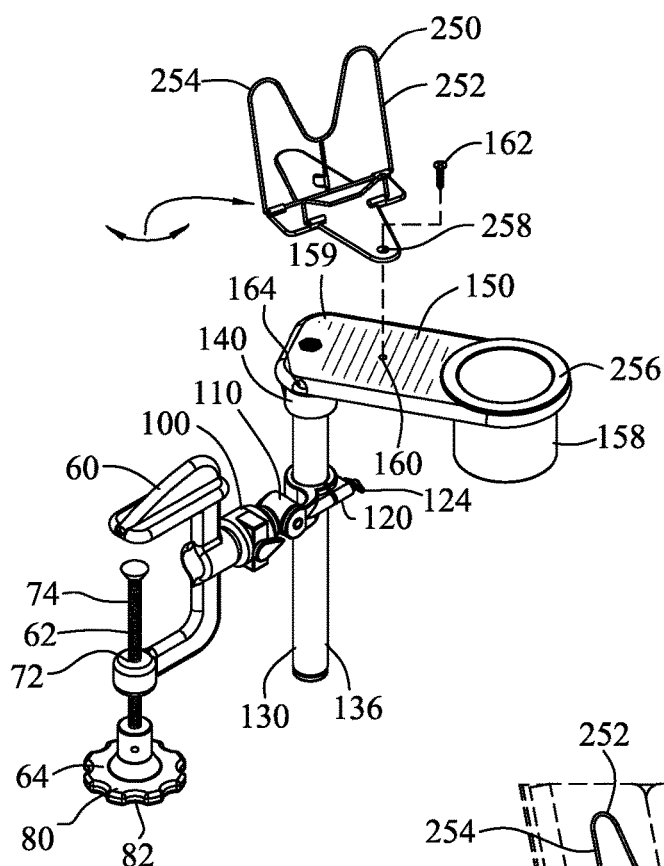
FIG. 29 is a view similar to FIG. 1 illustrating the book holder positioned. to engage with the platform.
Figure 30:
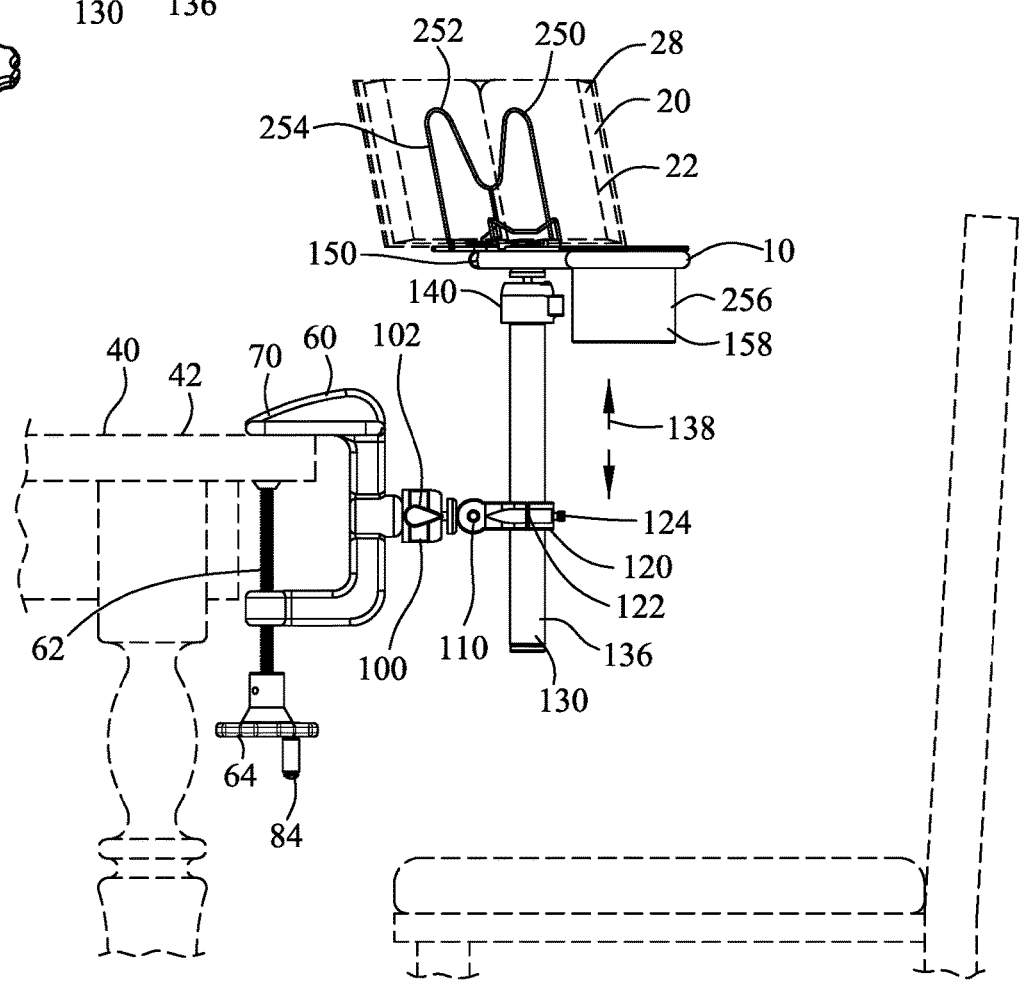
FIG. 30 is a view similar to FIG, 4 illustrating the support device engaging with a table and a book engaging with the book holder.
Figures 31, 32:
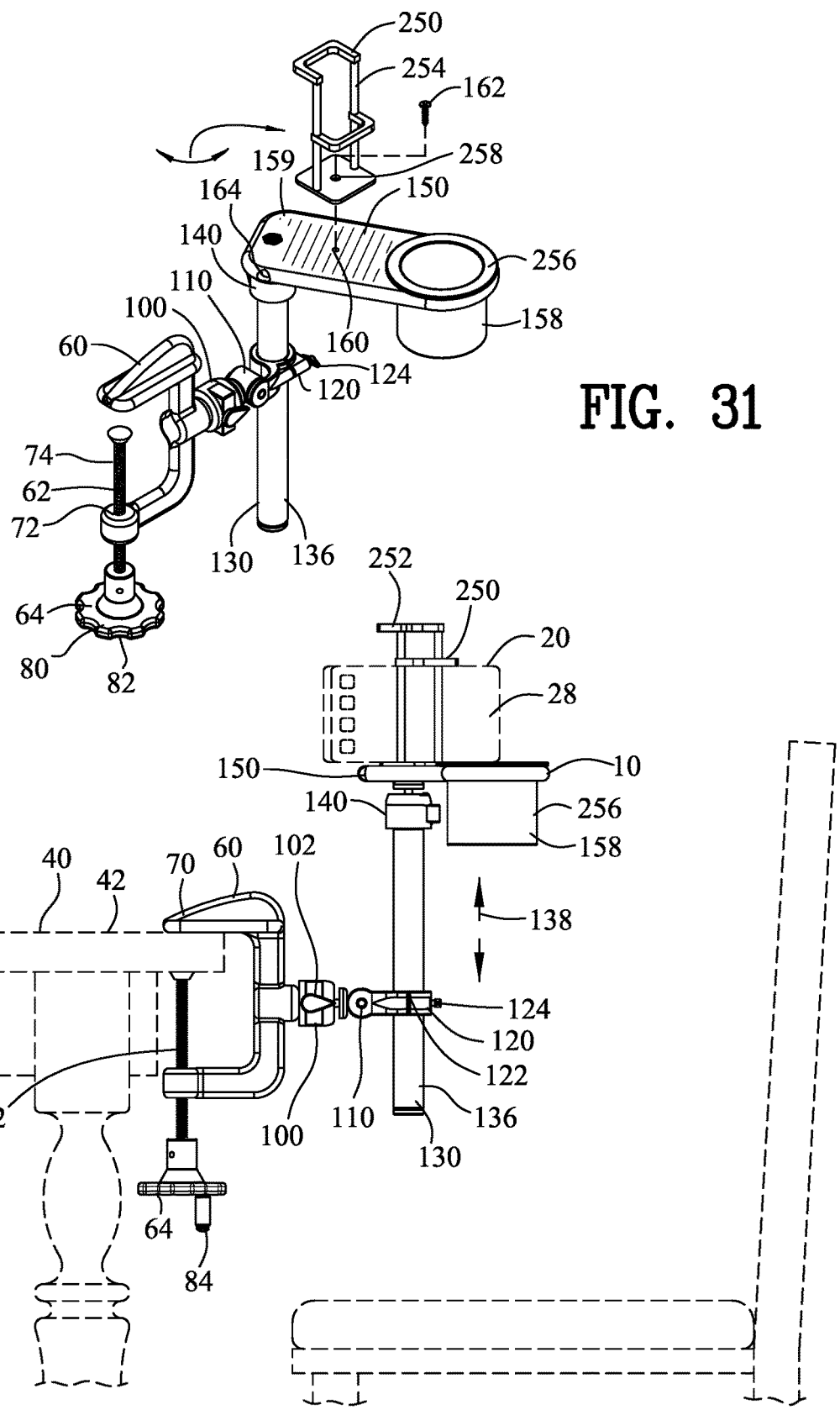
FIG. 31 is a view similar to FIG. 1 illustrating the electronic device holder positioned to engage with the platform.
FIG. 32 is a view similar to FIG. 4 illustrating the support device engaging with a table and an electronic device engaging with the electronic device holder.
Figure 33:
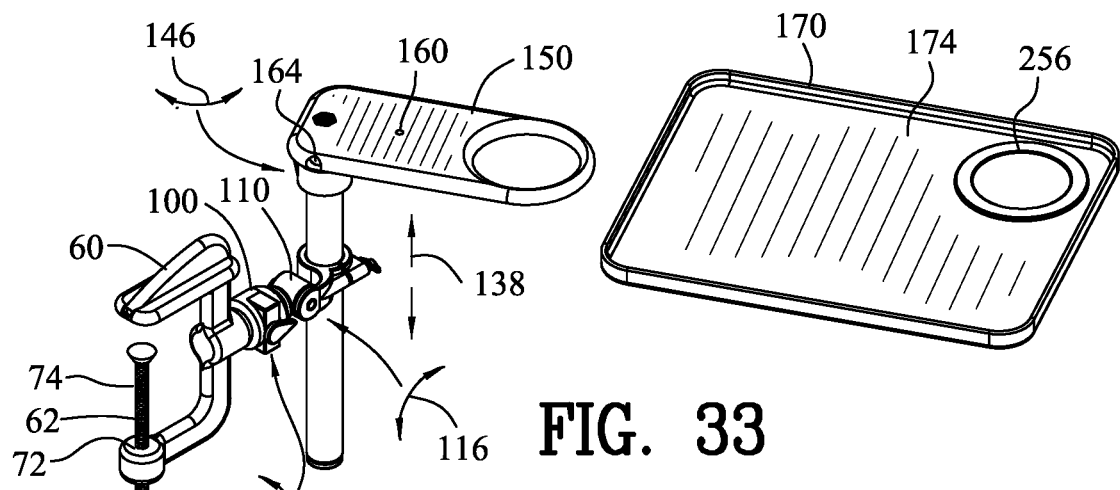
FIG. 33 is a view similar to FIG. 1 illustrating the first tray positioned to engage with the platform.
Figure 34:
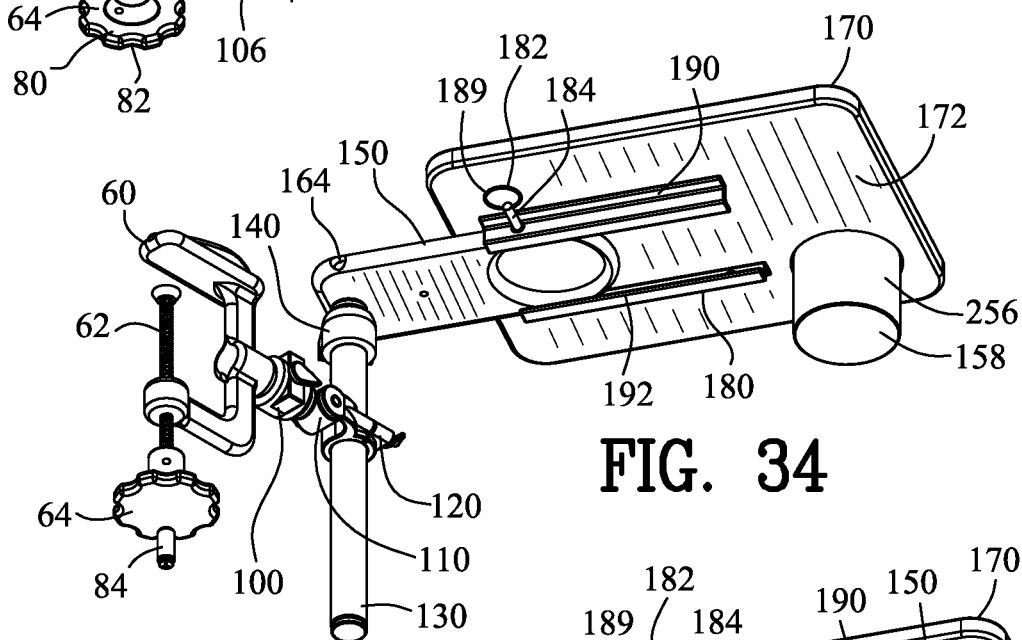
FIG. 34 is a lower isometric view of FIG. 33 illustrating the first tray engaging with the platform.
Figure 35:
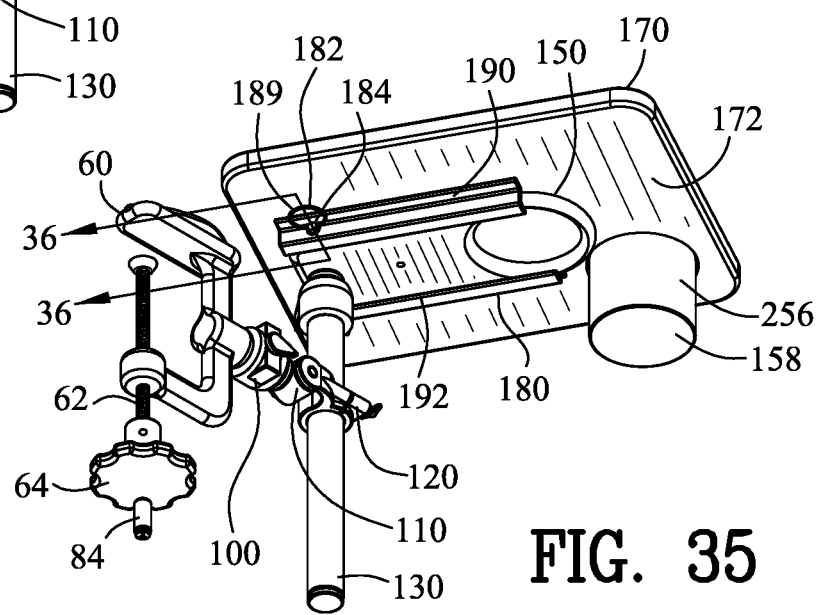
FIG. 35 is a view similar to FIG. 32 illustrating the first tray engaged with the platform.
Figure 36:
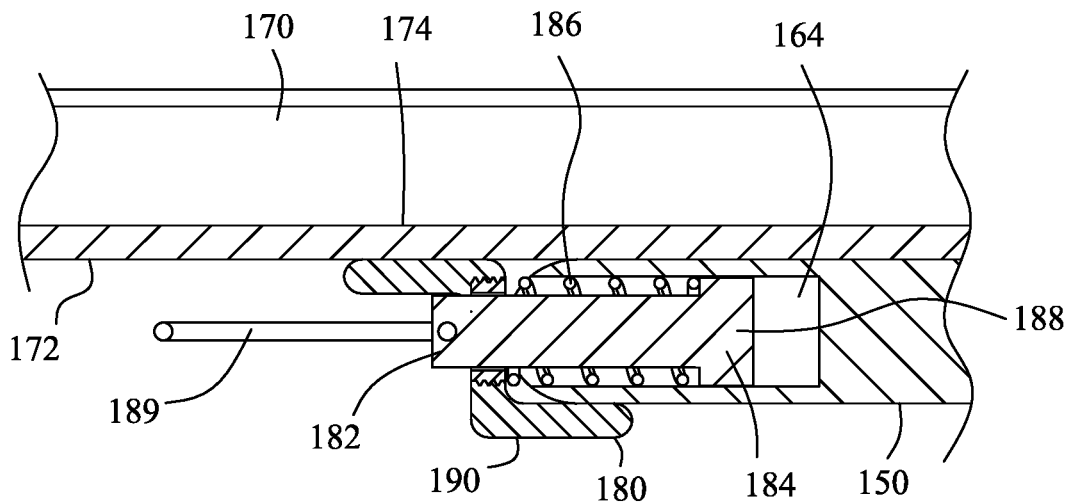
FIG. 36 is a sectional view along line 36-36 in FIG. 35.
Figure 37:
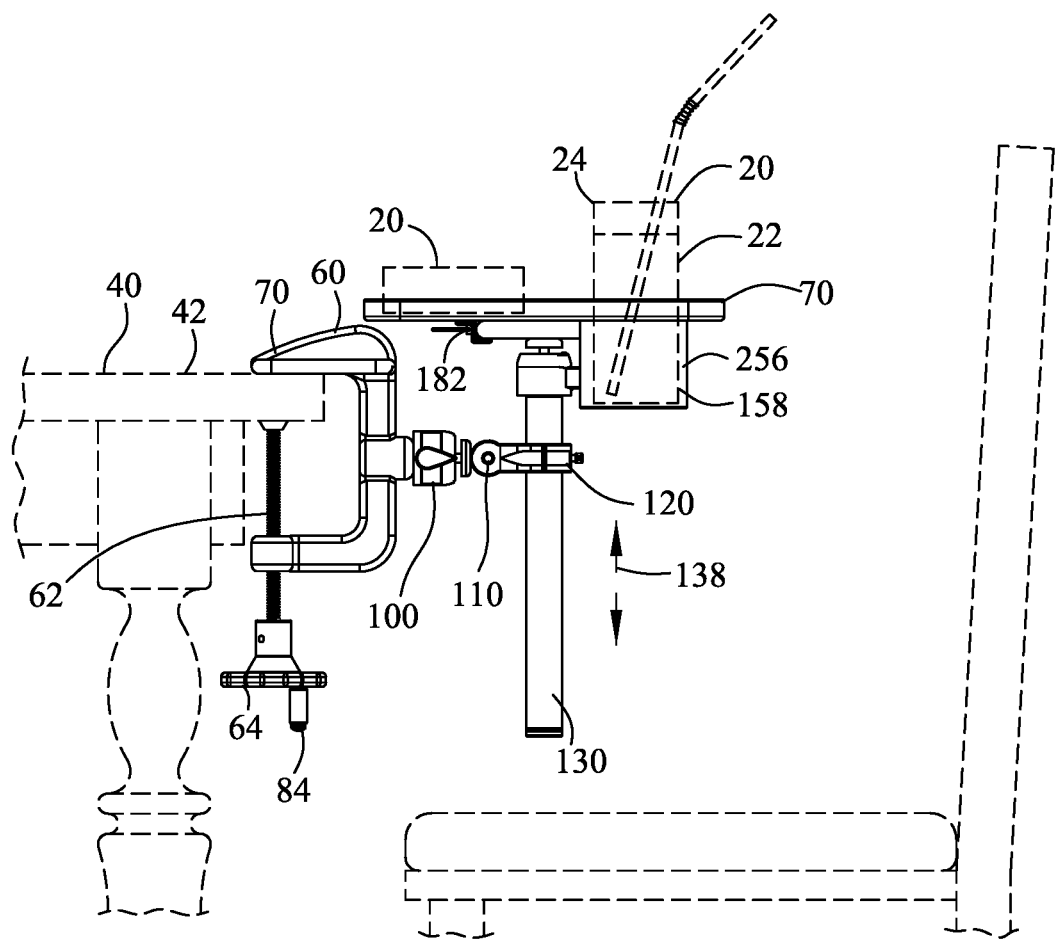
FIG. 37 is a side view of FIG. 35 illustrating the support device engaging with a table and a cup engaging with the cup holder.
Figure 38:
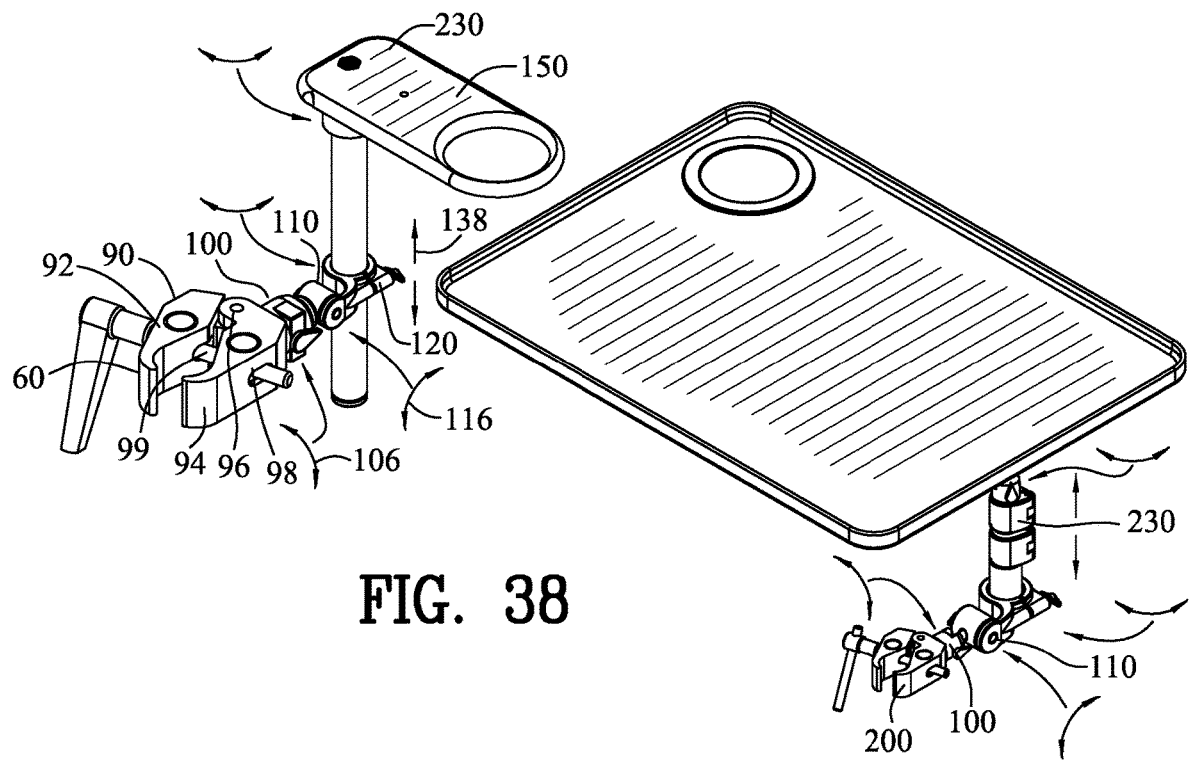
FIG. 38 is an upper isometric view of a second embodiment of a support device incorporating the present invention and illustrating the second tray positioned to engage with the platform.
Figure 39:
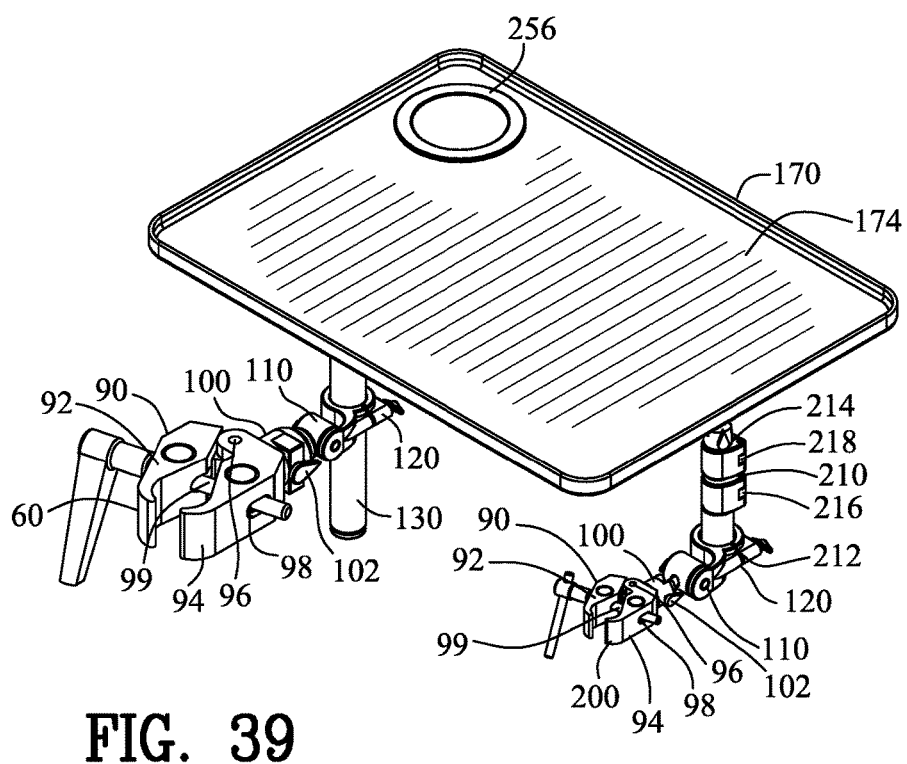
FIG. 39 is a view similar to FIG. 38 illustrating the second tray engaged with the platform.
Figure 40:
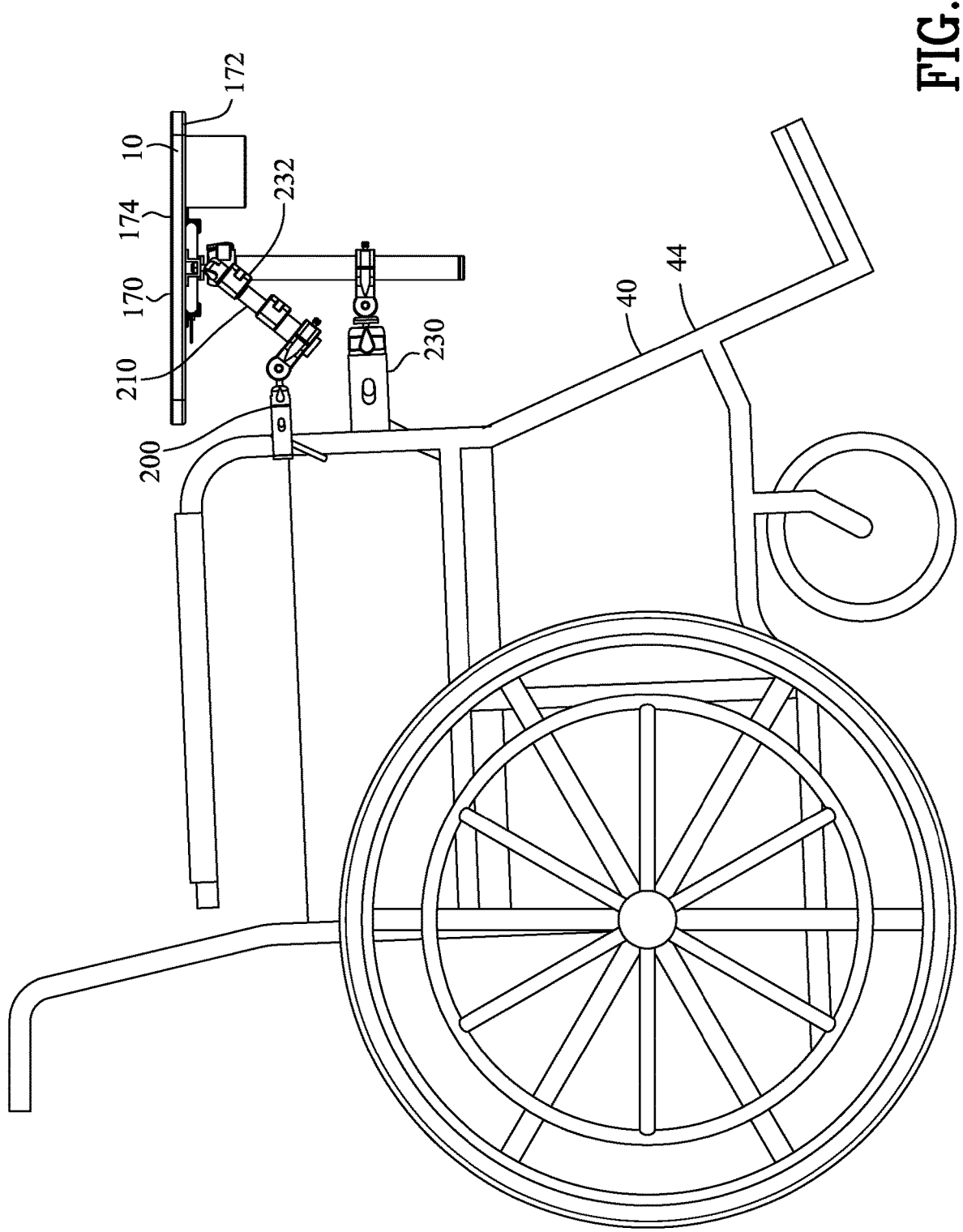
FIG. 40 is a side view of FIG. 39 illustrating the support device engaging with a wheelchair.
Figure 41:
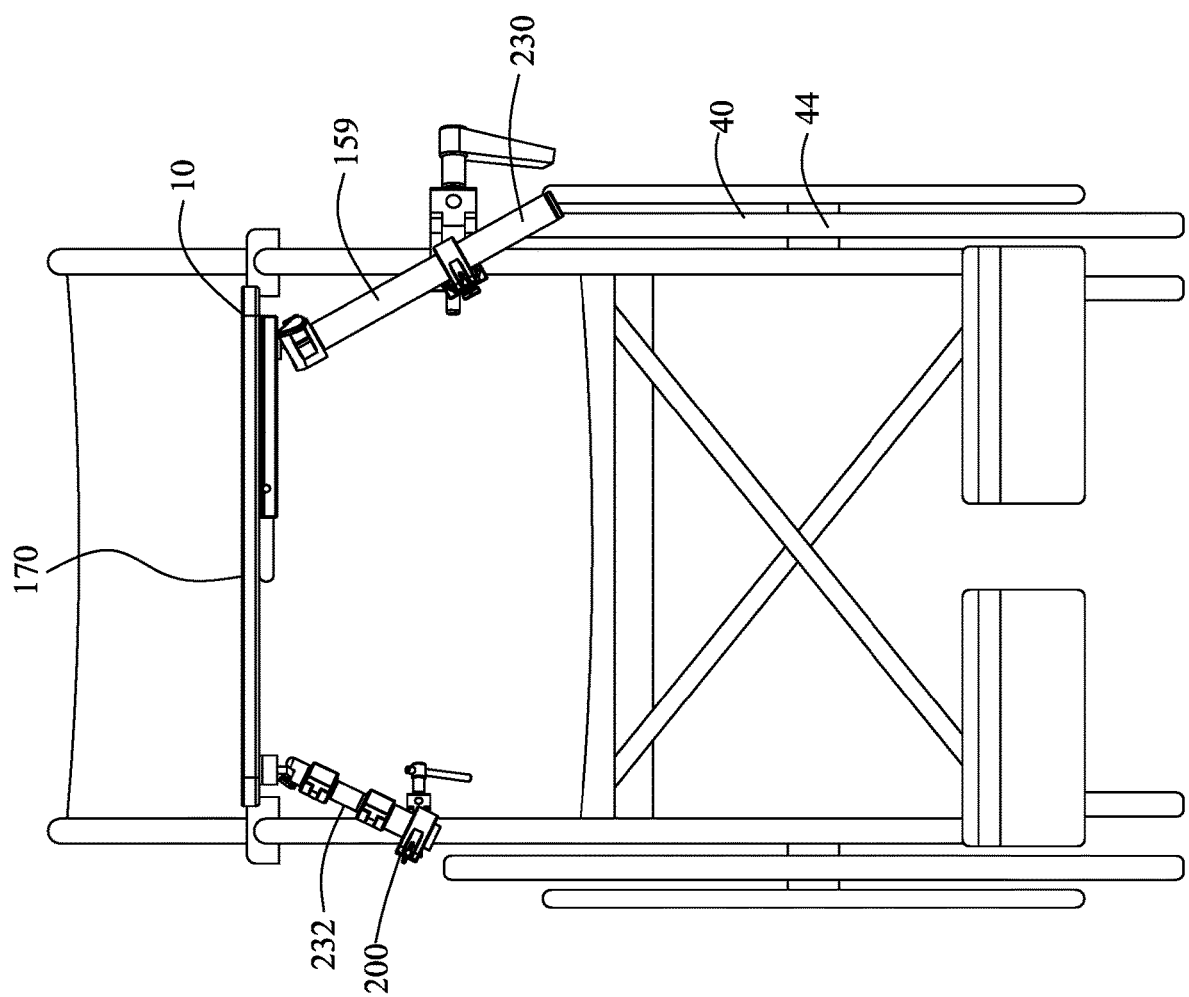
FIG. 41 is a front view of FIG. 40.
Figure 42:
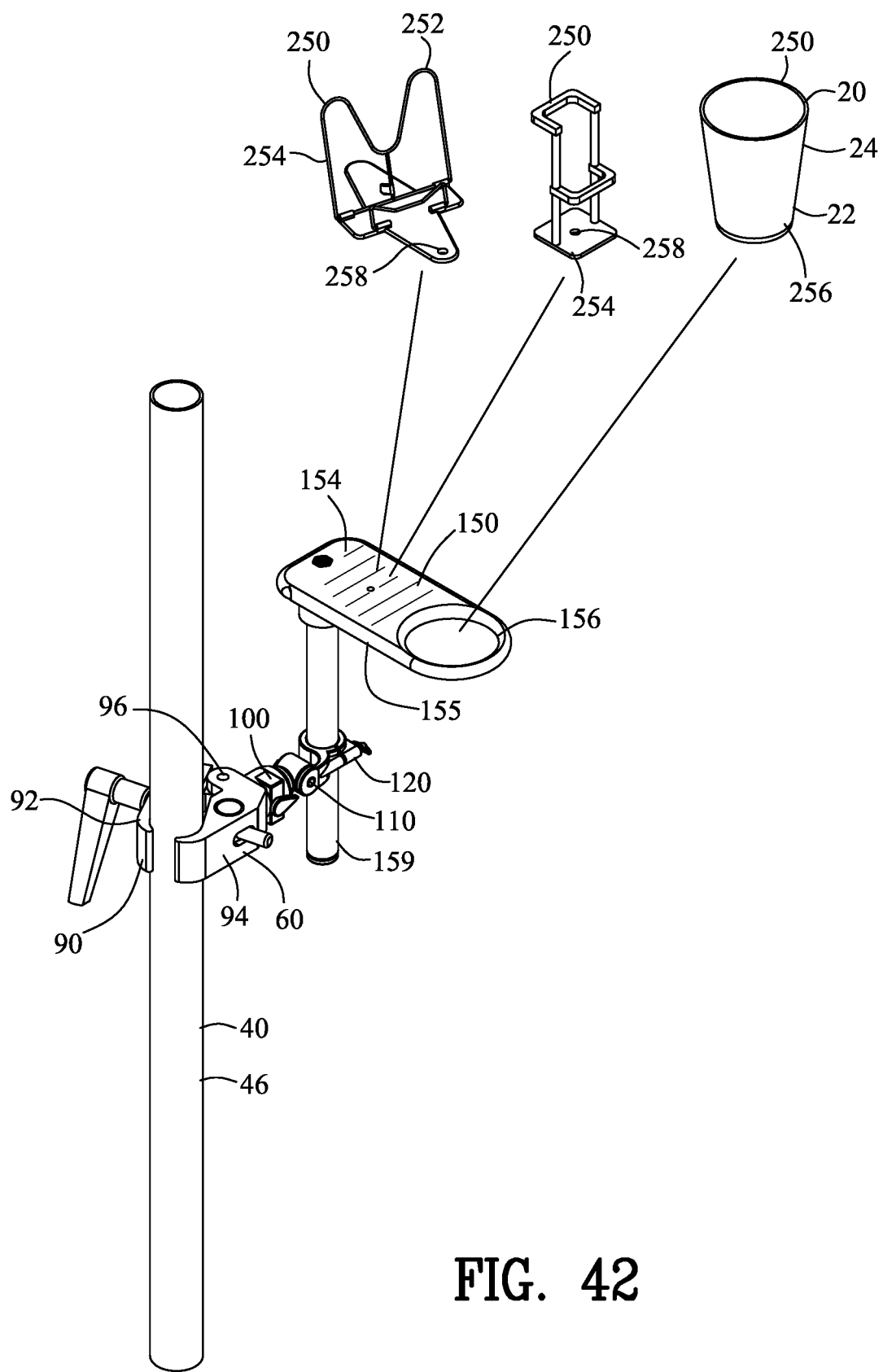
FIG. 42 is a view similar to FIG. 38 illustrating the support device coupled to a vertical pole and the book holder, electronic device holder or the cup holder positioned for engaging with the platform.

FIGS. 1-42 illustrate a support device 10 for supporting an object 20. The object 20 may include but not limited to a beverage container 22, cup 24, book 26, electronic device 28, or other items needing support. The support device 10 engages with a base 40. The base 40 may include but not limited to a table 42, a wheelchair 44, a pole 46 such as a IV stand or musical stand or other static or dynamic bases.

The support device 10 comprises a clamping member 60 applying a compressive force against the base 40. The clamping member 60 may include a threaded clamping lock 62 threadably engaging the clamping member 60 for the clamping member 60 to apply a compressive force against the base 40. A clamping arm 64 may be coupled to the threaded clamping lock 62 for permitting an increased rotational force with the threaded clamping lock 62.

As shown in FIGS. 1-6 and 27-37, the clamping member 60 may include a general C-shaped clamp 70. A threaded bore 72 is within the general C-shaped clamp 70. A threaded rod 74 threadably engages the threaded bore 72. A wheel 80 may be statically coupled to the threaded rod 74 and receives a rotational force for displacing the threaded rod 74 within the threaded bore 72. The wheel 80 may include a plurality of recessed grooves 82 for improving gripping of the wheel 80 by an individual's fingers. A rotating spinner knob 84 may be rotatably coupled to the wheel 80 for rotatably displacing the wheel 80. The rotating spinner knob 84 may expedite the rotation of the wheel 80 and more quickly apply the clamping member 60 against the base 40. The general C shaped clamp 70 may be utilized for coupling the support device 10 to a table 42 or other static or dynamic bases.

Alternatively, as shown in FIGS. 38-42, the clamping member 60 may include a jaws damp 90. The jaws clamp 90 includes a primary jaws arm 92, a secondary jaws arm 94 and a jaws pivot 96. A threaded bore 98 is within jaws clamp 90. A threaded rod 99 threadably engages the threaded bore 98 within the jaws clamp 90 for expanding or retracting the distance between the primary jaws arm 92 and the secondary jaws arm 94. The jaws clamp 90 may be utilized for coupling the support device 10 to a wheelchair 44, a pole 46, IV stand or musical stand or other static or dynamic bases.

A lower ball joint member 100 is coupled to the clamping member 60. Preferably, the lower ball joint member 100 allows for three dimensional rotation relative to the clamping member 60. A threaded lower ball joint lock 102, such a threaded rod, threadably engages the lower ball joint member 100 for fixing a pivot joint member 110 or a sleeve member 120 relative to the clamping member 60. A lower ball joint arm 104 is coupled to the threaded lower ball joint lock 102 for permitting an increased rotational force with the threaded lower ball joint lock 102.

The pivot joint member 110 may be coupled to the lower ball joint member 100. Preferably, the pivot joint member 110 allows for two dimensional rotation relative to the clamping member 60. A threaded pivot joint lock 112, such as a threaded rod, threadably engages the pivot joint member 110 for fixing a sleeve member 120 relative to the clamping member 60. A pivot joint arm 114 is coupled to the threaded pivot joint lock 112 for permitting an increased rotational force with the threaded pivot joint lock 112.

The sleeve member 120 may be coupled to the lower ball joint member 100 or to the pivot joint member 110. An arm member 130 slidably engages relative to the sleeve member 120 for defining an extension member 136. Preferably, the sleeve member 120 allows for an elevational displacement relative to the clamping member 60. The arm member 130 extends between a proximal arm end 132 to a distal arm end 134. A threaded sleeve lock 122 threadably engages the sleeve member 120 for fixing the arm member 130 relative to the clamping member 60. A sleeve arm 124 is coupled to the sleeve member 120 for permitting an increased rotational force with the threaded sleeve lock 122.

An upper ball joint member 140 may be coupled to the distal arm end 134 of the arm member 130. Preferably, the upper ball joint member 140 allows for three dimensional rotation relative to the clamping member 60. A threaded upper ball joint lock 142, such a threaded rod, threadably engages the upper ball joint member 140 for fixing a platform 150 relative to the clamping member 60. An upper ball joint arm 144 is coupled to the threaded upper ball joint lock 142 for permitting an increased rotational three with the threaded upper ball joint lock 142.

The platform 150 is coupled to the upper ball joint member 140 for supporting the object 20. The platform 150 includes a lower surface 152, an uppe surface 154 and a side surface 155. The platform 150 may support the object 20 upon the upper surface 154 of the platform 150. Furthermore, the object 20 may be coupled to the lower surface 152 of the platform 150. The platform 150 may further include a platform object aperture 156 for receiving the object 20. Furthermore, a cup holder insert 158 may be inserted within the platform object aperture 156 for receiving a cup 24 or other object 20.

The platform 150 may further include a platform mounting aperture 160 for engaging with a platform mounting fastener or linkage 162. The platform mounting fastener or linkage 162 may include a threaded bolt or screw. The platform 150 may support an object holding device 250 such as a book holder 252, and the electronic device holder 254, a cup holder 256 or other object holders. The object holding device 250 may include an object mounting aperture 258 for receiving the platform mounting fastener or linkage 162. The platform mounting fastener or linkage 162 may permit rotation of the object holding device 250 relative to the platform 150.

The lower ball joint member 100 defines a first pivoting non-planar adjustment 106 of the platform relative to the clamping member. The pivot joint member defines a pivoting planar adjustment 116 of the platform 150 relative to the clamping member 60. The extension member 136 defines art elevational adjustment 138 of the platform 150 relative to the clamping member 60. The upper ball joint member 140 defines a second pivoting non-planar adjustment 146 of the platform 150 relative to the clamping member 60. The clamping member 60, the lower ball joint member 100, the pivot joint member 110, the sleeve member 120, the arm member 130 and the upper ball joint member 140 define a three dimensional adjustable support 159 for the platform 150.

A tray 170 defines a lower surface 172 and an upper surface 174. A tray channel 180 is coupled to the lower surface 172 of the tray 170. The platform 150 slidably engages with the tray channel 180 and coupling the tray 170 with the platform 150. The tray channel 180 may include a primary channel wall 190 and a secondary channel wall 192 separated by a slightly larger dimension than the width of the platform 150. The tray 170 may include a tray object aperture 176 for receiving an elongated body, the cup holder 256 or other item.

The tray 170 as shown in FIGS. 15-20 and 33-37 may be designed for having a reduced surface area for supporting smaller items. For example, the tray 170 in FIGS. 15-20 and 33-37 may be utilized for supporting snacks, a notebook computer or other items. The tray 170 as shown in FIGS. 21-26 and 38-41 may be designed for having an increased surface area for supporting larger items. For example, the tray 170 in FIGS. 21-26 and 38-41 may be utilized for supporting a food serving tray, a full size meal, computer laptop or other items.

A tray lock 182 may be coupled to the tray channel 180 and engage with the platform 150 for locking the tray 180 relative to the platform 150. The tray lock 182 may define a pull pin 184 coupled to the tray channel 180 and biased in an extended position by a spring 186. The pull pin 184 may include an angled end 188 for slidably engaging with the platform 150 upon the platform 150 being engaged within the tray channel 180 and positioning the pull pin 184 in a non-extended position and compressing the spring 186. The platform 150 may include a void 164 in the side surface 155 of the platform 150. Upon the pull pin 184 being positioned above the void 164 the spring 186 biases the pull pin 184 into the void 164 for locking the tray 170 relative to the platform 150. The pull pin 184 may further include a ring 189 for grasping the pull pin 184 and withdrawing the pull pin 184 from the void 164 and compressing the spring 186. Once the pull pin 184 is removed from the void 164, the tray 170 may be removed relative to the platform 150.

The support device 10 as shown in FIGS. 38-41, may include a second clamping member 200 for applying a compressive force against the base 40. The second clamping member 200 may include the similar structure and configuration as discussed above for the clamping member 60 and share the same reference patent drawing numbers. The second clamping member 200 may have the equivalent structural dimensions as the clamping member 60. Alternatively, the second clamping member 200 may have a reduction in the structural dimensions as compared to the clamping member 60 in the event that the second clamping member 200 is intended to only partially support and stabilize the tray 170.

The second clamping member 200 may further include a telescoping member 210 extending between a proximal end 212 and a distal end 214. The proximal end 212 of the telescoping member 210 is coupled to the second clamping member 200. The upper ball joint member 140 couples the distal end 214 of the telescoping member 210 to the lower surface 172 of the tray 170. The telescoping member 210 may further include a telescope lock 216 that terminates expansion and contraction of the length of the telescoping member 210. The telescope lock 216 may include one or more compression clamps 218, one or more threaded pins or one or more locking pins.

The clamping member 60, the lower ball joint member 100, the pivot joint member 110, the sleeve member 120, the arm member 130 and the upper ball joint member 140 define a primary three dimensional adjustable support 230 for the tray 170. The second clamping member 200, telescoping member 210 and the ball joint member 140 define a secondary three dimensional adjustable support 232 for the tray 170.

A riser bracket 220 may be positioned between the ball joint member 140 and the lower surface 172 of the tray 170 for distancing the ball joint member 140 from the lower surface 172 of the tray 170. The riser bracket 220 perrnits the second clamping member 200 to be positioned adjacent and parallel to the lower surface 172 of the tray 170 for defining a second clamping member storage position 222. The tray channel 180 and the second clamping member storage position 232 define a plurality of tray support legs 224 for positioning a surface or on the base or stacking a plurality of trays 170.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A support device for supporting an object with a base, the support device, comprising:
   a clamping member applying a compressive force against the base;
   a lower ball joint member directly coupled to said clamping member;
   a pivot joint member coupled to said lower ball joint member;
   a sleeve member coupled to said pivot joint member;
   an arm member slidably engaging relative to said sleeve member for defining an extension member;
   said arm member being offset from the base in a horizontal direction;
   an upper ball joint member directly coupled to said arm member;
   a platform coupled to said upper ball joint member for supporting the object;

said lower ball joint member defining a first pivoting non-planar adjustment of said platform adjacent to said clamping member;

said pivot joint member defining a pivoting planar adjustment of said platform relative to said clamping member;

said extension member defining an elevational adjustment of said platform relative to said clamping member;

said upper ball joint member defining a second pivoting non-planar adjustment of said platformn adjacent to said platform; and said clamping member, said lower ball joint member, said pivot joint member, said sleeve member, said arm member and said upper ball joint member defining a three dimensional adjustable support for said platform.

2. The support device as set forth in claim 1, further including a threaded clamping lock threadably engaging said clamping member for said clamping member applying a compressive force against the base; and a clamping arm coupled to said threaded clamping lock for permitting an increased rotational force with said threaded clamping lock.

3. The support device as set forth in claim 1, wherein said clamping member defines a general C-shaped clamp;

a threaded bore within said general C-shaped clamp;

a threaded rod threadably engages said threaded bore;

a wheel statically coupled to said threaded rod and receives a rotational force for displacing said threaded rod within said threaded bore; and a rotating spinner knob rotatably coupled to said wheel for rotatably displacing said wheel.

4. The support device as set forth in claim 1, further including a threaded lower ball joint lock threadably engaging said lower ball joint member for fixing said pivot joint member relative to said clamping member; and a lower ball joint arm coupled to said threaded lower ball joint lock for permitting an increased rotational force with said threaded lower ball joint lock.

5. The support device as set forth in claim 1, further including a threaded pivot joint lock threadably engaging said pivot joint member for fixing said sleeve member relative to said clamping member; and a pivot joint arm coupled to said threaded pivot joint lock for permitting an increased rotational force with said threaded pivot joint lock.

6. The support device as set forth in claim 1, further including a threaded sleeve lock threadably engaging said sleeve member for fixing said arm member relative to said clamping member; and a sleeve arm coupled to said sleeve member for permitting an increased rotational force with said threaded sleeve lock.

7. The support device as set forth in claim 1, further including a threaded upper ball joint lock threadably engaging said upper ball joint member for fixing the platform relative to said clamping member; and an upper ball joint arm coupled to said threaded upper ball joint lock for permitting an increased rotational force with said threaded upper ball joint lock.

8. The support device as set forth in claim 1, further including a tray defining a lower surface and an upper surface;

a tray channel coupled to said lower surface of said tray;

said platform slidably engaging with said tray channel and coupling said tray with said platform; and said clamping member, said lower ball joint member, said pivot joint member, said sleeve member, said arm member and said upper ball joint member defining a primary three dimensional adjustable support for said tray.

9. The support device as set forth in claim 8, further including a tray lock coupled to said tray channel and engaging with said platform for locking said tray relative to said platform.

10. The support device as set forth in claim 9, wherein said tray lock defines a pull pin biased in an extended position by a spring; and said pull pin inserted into a void in said platform for locking said tray relative to said platform.

11. The support device as set forth in claim 8, further including, a second clamping member applying a compressive force against the base;

a telescoping member extending between a proximal end and a distal end;

said proximal end of said telescoping member coupled to said second clamping member;

a ball joint member coupling said distal end of said telescoping member to said lower surface of said tray; and said second clamping member, telescoping member and said ball joint member defining a secondary three dimensional adjustable support for said tray.

12. The support device as set forth in claim 11, further including a riser bracket between said ball joint member and said lower surface of said tray for distancing said ball joint member from said lower surface of said tray; and said riser bracket permitting said second clamping member to be positioned adjacent to said lower surface of said tray for defining a second damping member storage position.

13. The support device as set forth in claim 12, wherein said tray channel and said second damping member storage position define a plurality of tray support legs for positioning on the base or stacking a plurality of trays.

14. The support device as set forth in claim 11, further including a second threaded clamping lock threadably engaging said second clamping member for said second clamping member applying a compressive force against the base; and a second clamping arm coupled to said second threaded clamping lock for permitting an increased rotational force with said second threaded clamping lock.

15. The support device as set forth in claim 1, wherein said platform includes an aperture for receiving the object.

16. The support device as set forth in claim 1, further including an object holding device for engaging with the object; and a linkage coupling said object holding device with said platform.

17. The support device as set forth in claim 16, wherein said object holding device includes a book holder.

18. The support device as set forth in claim 16, wherein said object holding device includes an electronic device holder.

19. The support device as set forth in claim 16, wherein said object holding device includes a cup holder; and said linkage defined by said cup holder slidably engaging into said aperture in said platform.

20. A support device for supporting an object with a base, the support device, comprising:

a clamping member applying a compressive force against the base;

a lower ball joint member directly coupled to said clamping member;

a sleeve member coupled to said lower ball joint member;
an arm member slidably engaging relative to said sleeve member for defining an extension member;
said arm member being offset from the base in a horizontal direction;
an upper ball joint member directly coupled to said arm member;
a platform coupled to said upper ball joint member for supporting the object;
said lower ball joint member defining a first pivoting non-planar adjustment of said platform adjacent to said clamping member;
said extension member defining an elevational adjustment of said platformrelative to said clamping member; and
said upper ball joint member defining a second pivoting non-planar adjustment of said adjacent to said clamping member.

21. A support device for supporting an object with a base, the support device, comprising:
a clamping member applying a compressive force against the base;
a lower ball joint member directly coupled to said clamping member;
a pivot joint member coupled to said lower ball joint member;
a sleeve joint member coupled to said pivot joint member;
an arm member slidably engaging relative to said sleeve member for defining an extension member;
said arm member being offset from the base in a horizontal direction;
an upper ball joint member directly coupled to said arm member;
a platform coupled to said upper ball joint member for supporting the object;
said lower ball joint member defining a first pivoting non-planar adjustment of said platform relative to said clamping member;
said pivot joint member defining a pivoting planar adjustment of said platform relative to said clamping member;
said extension member defining an elevational adjustment of said platform relative to said clamping member;
said upper ball joint member defining a second pivoting non-planar adjustment of said platform relative to said clamping member;
said clamping member, said lower ball joint member, said pivot joint member, said sleeve member, said arm member and said upper ball joint member defining a three dimensional adjustable support for said platform;
a tray defining a lower surface and an upper surface;
a tray channel coupled to said lower surface of said tray;
said platform slidably engaging with said tray channel and coupling said tray with said platform; and
said clamping member, said lower ball joint member, said pivot joint member, said sleeve member, said arm member and said upper ball joint member defining a primary three dimensional adjustable support for said tray.

22. The support device as set forth in claim 21, further including a tray lock coupled to said tray channel and engaging with said platform for locking said tray relative to said platform.

23. The support device as set forth in claim 22, wherein said tray lock defines a pull pin biased in an extended position by a spring; and
said pull pin inserted into a void in said platform for locking said tray relative to said platform.

24. The support device as set forth in claim 21, further including a second clamping member applying a compressive force against the base;
a telescoping member extending between a proximal end and a distal end;
said proximal end of said telescoping member coupled to said second clamping member;
a ball joint member coupling said distal end of said telescoping member to said lower surface of said tray; and
said second clamping member, telescoping member and said ball joint member defining a secondary three dimensional adjustable support for said tray.

25. The support device as set forth in claim 24, further including a riser bracket between said ball joint member and said lower surface of said tray for distancing said ball joint member from said lower surface of said tray; and
said riser bracket permitting said second clamping member to be positioned adjacent to said lower surface of said tray for defining a second clamping member storage position.

26. The support device as set forth in claim 25, wherein said tray channel and said second clamping member storage position define a plurality of tray support legs for positioning on the base or stacking a plurality of trays.

27. The support device as set forth in claim 24, further including a second threaded clamping lock threadably engaging said second clamping member for said second clamping member applying a compressive force against the base; and
a second clamping arm coupled to said second threaded clamping lock for permitting an increased rotational force with said second threaded clamping lock.

28. The support device as set forth in claim 21, further including an object holding device for engaging with the object;
a linkage coupling said object holding device with said platform;
said object holding device includes a cup holder; and
said linkage defined by said cup holder slidably engaging into said aperture in said platform.

29. A support device for supporting an object, the support device engaging with a base,
the support device, comprising:
a clamping member applying a compressive force against the base;
a lower ball joint member directly coupled to said clamping member;
a pivot joint member coupled to said lower ball joint member;
a sleeve member coupled to said pivot joint member;
an arm member slidably engaging relative to said sleeve member for defining an extension member;
said arm member being offset from the base in a horizontal direction;
an upper ball joint member directly coupled to said arm member;
a platform coupled to said upper ball joint member for supporting the object;
said lower ball joint member defining a first pivoting non-planar adjustment of said platform relative to said clamping member;
said pivot joint member defining a pivoting planar adjustment of said platform relative to said clamping member;
said extension member defining an elevational adjustment of said platform relative to said clamping member;

said upper ball joint member defining a second pivoting non-planar adjustment of said platform relative to said clamping member;

said clamping member, said lower ball joint member, said pivot joint member, said sleeve member, said arm member and said upper ball joint member defining a three dimensional adjustable support for said platform;

an object holding device for engaging with the object;

a linkage coupling said object holding device with said platform; and said object holding device includes a cup holder.

30. A support device for supporting an object with a base, the support device, comprising:

a clamping member applying a compressive force against the base;

a lower ball joint member directly coupled to said clamping member;

a pivot joint member coupled to said lower ball joint member;

a sleeve member coupled to said pivot joint member;

an arm member slidably engaging relative to said sleeve member for defining an extension member;

said arm member being offset from the base in a horizontal direction;

said arm member having a general perpendicular orientation to said sleeve member;

an upper ball joint member directly coupled to said arm member;

a platform coupled to said upper ball joint member for supporting the object;

said lower ball joint member defining a first pivoting non-planar adjustment of said platform relative to said clamping member;

said pivot joint member defining a pivoting planar adjustment of said platform relative to said clamping member;

said extension member defining an elevational adjustment of said platform relative to said clamping member;

said upper ball joint member defining a second pivoting non-planar adjustment of said platform relative to said clamping member; and said clamping member, said lower ball joint member, said pivot joint member, said sleeve member, said arm member and said upper ball joint member defining a three dimensional adjustable support for said platform.

* * * * *